US012598679B2

(12) United States Patent
Newman, Jr.

(10) Patent No.: US 12,598,679 B2
(45) Date of Patent: Apr. 7, 2026

(54) LOAD CONTROL DEVICE HAVING A CONTROLLABLE FILTER CIRCUIT

(71) Applicant: Lutron Technology Company LLC, Coopersburg, PA (US)

(72) Inventor: Robert C. Newman, Jr., Emmaus, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 233 days.

(21) Appl. No.: 18/426,882

(22) Filed: Jan. 30, 2024

(65) Prior Publication Data

US 2024/0172339 A1 May 23, 2024

Related U.S. Application Data

(63) Continuation of application No. 17/676,883, filed on Feb. 22, 2022, now Pat. No. 11,924,932, which is a (Continued)

(51) Int. Cl.
*H05B 39/04* (2006.01)
*H05B 45/3725* (2020.01)
(Continued)

(52) U.S. Cl.
CPC ............. *H05B 39/04* (2013.01); *H05B 45/50* (2020.01); *H05B 45/59* (2022.01); *H05B 45/3725* (2020.01)

(58) Field of Classification Search
CPC .... H05B 45/10; H05B 47/19; H05B 47/1965; H05B 47/105; H05B 47/11; H05B 47/185; H05B 47/196; H05B 47/1985; H05B 41/2828; H05B 41/3925; H05B 45/12; H05B 45/37; H05B 45/375; H05B 45/38; H05B 45/39; H05B 47/13; H05B 47/195; H05B 47/197; H05B 41/295;
(Continued)

(56) References Cited

U.S. PATENT DOCUMENTS 7,868,561 B2 1/2011 Weightman et al.
7,906,916 B2 3/2011 Gehman
(Continued)

*Primary Examiner* — Monica C King
(74) *Attorney, Agent, or Firm* — Michael S. Czarnecki; Glen R. Farbanish; Philip N. Smith

(57) ABSTRACT

A load control device may be configured to control an electrical load, such as a lighting load. The load control device may include a first terminal adapted to be coupled to an alternating-current (AC) power source, and a second terminal adapted to be coupled to the electrical load. The load control device may include a bidirectional semiconductor switch, a filter circuit, and a control circuit. The bidirectional semiconductor switch may be coupled in series between the first terminal and the second terminal, and be configured to provide a phase-control voltage to the electrical load. The filter circuit may be coupled between the first terminal and the second terminal. The control circuit may be configured to render the bidirectional semiconductor switch conductive and non-conductive to control an amount of power delivered to the electrical load, and be configured to adjust the impedance and/or filtering characteristics of the filter circuit.

30 Claims, 8 Drawing Sheets

Related U.S. Application Data continuation of application No. 16/927,326, filed on Jul. 13, 2020, now Pat. No. 11,259,385, which is a continuation of application No. 16/453,435, filed on Jun. 26, 2019, now Pat. No. 10,716,185.

(60) Provisional application No. 62/689,910, filed on Jun. 26, 2018.

(51) Int. Cl.
*H05B 45/50* (2022.01)
*H05B 45/59* (2022.01)

(58) Field of Classification Search
CPC .............. H05B 41/3924; H05B 47/115; H05B 39/086; H05B 39/088; H05B 41/16; H05B 39/08; H05B 47/10; H05B 47/165; H05B 47/18; H05B 47/183; H05B 47/198; H05B 41/2827; H05B 6/062; H05B 2206/022; H05B 41/042; H05B 6/1254
See application file for complete search history.

(56) References Cited

U.S. PATENT DOCUMENTS

| | | | | |
|---|---|---|---|---|
| 8,664,881 | B2 | 3/2014 | Newman, Jr. et al. | |
| 8,698,408 | B2 | 4/2014 | Newman, Jr. | |
| 8,957,662 | B2 | 2/2015 | Newman, Jr. et al. | |
| 8,988,050 | B2 | 3/2015 | Newman, Jr. et al. | |
| 9,084,324 | B2 | 7/2015 | Salvestrin | |
| 9,160,224 | B2 | 10/2015 | Newman, Jr. et al. | |
| 9,385,806 | B2 | 7/2016 | Kido | |
| 10,194,501 | B2 | 1/2019 | DeJonge | |
| 10,716,185 | B2 | 7/2020 | Newman, Jr. | |
| 11,259,385 | B2 | 2/2022 | Newman, Jr. | |
| 2002/0047608 | A1 | 4/2002 | Takahashi et al. | |
| 2007/0285027 | A1 * | 12/2007 | Gehman | H05B 39/085 315/209 SC |
| 2008/0224624 | A1 | 9/2008 | Richter | |
| 2009/0251059 | A1 | 10/2009 | Veltman | |
| 2011/0121744 | A1 | 5/2011 | Salvestrini et al. | |
| 2012/0049752 | A1 | 3/2012 | King et al. | |
| 2012/0230073 | A1 | 9/2012 | Newman, Jr. et al. | |
| 2013/0154495 | A1 | 6/2013 | He | |
| 2013/0249437 | A1 | 9/2013 | Wang et al. | |
| 2014/0265933 | A1 | 9/2014 | Melanson et al. | |
| 2014/0346963 | A1 | 11/2014 | Kang | |
| 2015/0023078 | A1 | 1/2015 | Renard et al. | |
| 2015/0156842 | A1 | 6/2015 | Miyahara et al. | |
| 2015/0349567 | A1 | 12/2015 | Weightman et al. | |
| 2016/0021714 | A1 | 1/2016 | Williams et al. | |
| 2017/0311400 | A1 | 10/2017 | Newman, Jr. et al. | |
| 2020/0382120 | A1 | 12/2020 | Brogan et al. | |
| 2023/0009890 | A1 | 1/2023 | Fowler | |
| 2023/0223833 | A1 | 7/2023 | Newman, Jr. et al. | |

* cited by examiner

LOAD CONTROL DEVICE HAVING A CONTROLLABLE FILTER CIRCUIT

CROSS-REFERENCE TO RELATED APPLICATIONS

This application is a continuation of U.S. patent application Ser. No. 17/676,883, filed Feb. 22, 2022; which is a continuation of U.S. patent application Ser. No. 16/927,326 filed Jul. 13, 2020 now U.S. Pat. No. 11,259,385 issued Feb. 22, 2022; which is a continuation of U.S. patent application Ser. No. 16/453,435, filed on Jun. 26, 2019 now U.S. Pat. No. 10,716,185 issued Jul. 14, 2020, all of which claim the benefit of U.S. Provisional Patent Application No. 62/689,910, filed Jun. 26, 2018, the entire disclosures of which are hereby incorporated by reference.

BACKGROUND

Prior art two-wire load control devices, such as dimmer switches, are coupled in series electrical connection between an alternating-current (AC) power source and a lighting load for controlling the amount of power delivered from the AC power source to the lighting load. A two-wire wall-mounted dimmer switch is adapted to be mounted to a standard electrical wallbox and comprises two load terminals: a hot terminal adapted to be coupled to the hot side of the AC power source and a dimmed hot terminal adapted to be coupled to the lighting load. In other words, the two-wire dimmer switch does not require a connection to the neutral side of the AC power source (i.e., the load control device is a “two-wire” device). Prior art “three-way” dimmer switches may be used in three-way lighting systems and comprise at least three load terminals, but do not require a connection to the neutral side of the AC power source.

The dimmer switch typically comprises a bidirectional semiconductor switch, e.g., a thyristor (such as a triac) or two field-effect transistors (FETs) in anti-series connection. The bidirectional semiconductor switch is coupled in series between the AC power source and the load and is controlled to be conductive and non-conductive for portions of a half cycle of the AC power source to thus control the amount of power delivered to the electrical load. Generally, dimmer switches use either a forward phase-control dimming technique or a reverse phase-control dimming technique in order to control when the bidirectional semiconductor switch is rendered conductive and non-conductive to thus control the power delivered to the load. The dimmer switch may comprise a toggle actuator for turning the lighting load on and off and an intensity adjustment actuator for adjusting the intensity of the lighting load. Examples of prior art dimmer switches are described in greater detail is commonly-assigned U.S. Pat. No. 5,248,919, issued Sep. 29, 1993, entitled LIGHTING CONTROL DEVICE; U.S. Pat. No. 6,969,959, issued Nov. 29, 2005, entitled ELECTRONIC CONTROL SYSTEMS AND METHODS; and U.S. Pat. No. 7,687,940, issued Mar. 30, 2010, entitled DIMMER SWITCH FOR USE WITH LIGHTING CIRCUITS HAVING THREE-WAY SWITCHES, the entire disclosures of which are hereby incorporated by reference.

With forward phase-control dimming, the bidirectional semiconductor switch is rendered conductive at some point within each AC line voltage half cycle and remains conductive until approximately the next voltage zero-crossing of the AC line voltage, such that the bidirectional semiconductor switch is conductive for a conduction time each half cycle. A zero-crossing is defined as the time at which the AC line voltage transitions from positive to negative polarity, or from negative to positive polarity, at the beginning of each half cycle. Forward phase-control dimming is often used to control energy delivered to a resistive or inductive load, which may include, for example, an incandescent lamp or a magnetic low-voltage transformer. The bidirectional semiconductor switch of a forward phase-control dimmer switch is typically implemented as a thyristor, such as a triac or two silicon-controlled rectifiers (SCRs) coupled in anti-parallel connection, since a thyristor becomes non-conductive when the magnitude of the current conducted through the thyristor decreases to approximately zero amps.

When using reverse phase-control dimming, the bidirectional semiconductor switch is rendered conductive at the zero-crossing of the AC line voltage and rendered non-conductive at some point within each half cycle of the AC line voltage, such that the bidirectional semiconductor switch is conductive for a conduction time each half cycle. Reverse phase-control dimming is often used to control energy to a capacitive load, which may include, for example, an electronic low-voltage transformer. Since the bidirectional semiconductor switch must be rendered conductive at the beginning of the half cycle, and must be able to be rendered non-conductive within the half cycle, reverse phase-control dimming requires that the dimmer switch have two FETs in anti-serial connection, or the like. A FET may be rendered conductive and to remain conductive independent of the magnitude of the current conducted through the FET. In other words, a FET is not limited by a rated latching or holding current as is a thyristor. However, prior art reverse phase-control dimmer switches have either required neutral connections and/or advanced control circuits (such as microprocessors) for controlling the operation of the FETs. In order to power a microprocessor, the dimmer switch must also comprise a power supply, which is typically coupled in parallel with the FETs. These advanced control circuits and power supplies add to the cost of prior art FET-based reverse phase-control dimmer switches, for example, as compared to analog forward phase-control dimmer switches.

Nevertheless, it is desirable to be able to control the amount of power to electrical loads having power rating lower than those able to be controlled by the prior art forward and reverse phase-control dimmer switches. In order to save energy, high-efficiency lighting loads, such as, for example, compact fluorescent lamps (CFLs) and light-emitting diode (LED) light sources, are being used in place of or as replacements for conventional incandescent or halogen lamps. High-efficiency light sources typically consume less power and provide longer operational lives as compared to incandescent and halogen lamps. In order to illuminate properly, a load regulation device (e.g., such as an electronic dimming ballast or an LED driver) must be coupled between the AC power source and the respective high-efficiency light source (e.g., the compact fluorescent lamp or the LED light source) for regulating the power supplied to the high-efficiency light source.

A dimmer switch controlling a high-efficiency light source may be coupled in series between the AC power source and the load control device for the high-efficiency light source. Some high-efficiency lighting loads are integrally housed with the load regulation devices in a single enclosure. Such an enclosure may have a screw-in base that allows for mechanical attachment to standard Edison sockets, and provide electrical connections to the neutral side of the AC power source and either the hot side of the AC power source or the dimmed-hot terminal of the dimmer switch (e.g., for receipt of the phase-control voltage). The load regulation circuit may be configured to control the intensity of the high-efficiency light source to the desired intensity in response to the conduction time of the bidirectional semiconductor switch of the dimmer switch.

A dimmer switch for controlling a high-efficiency light source may be configured for constant gate drive, where a control circuit of the dimmer switch provides constant gate drive to the bidirectional semiconductor switch so the bidirectional semiconductor switch remains conductive independent of the magnitude of the load current. For example, the dimmer switch may use a FET to keep the triac conductive by ensuring that the gate current is above the holding current of the triac. Examples of such a dimmer switch are described in greater detail in commonly-assigned U.S. Pat. No. 8,664,881, issued Mar. 4, 2014, entitled TWO-WIRE DIMMER SWITCH FOR LOW-POWER LOADS, the entire disclosure of which is hereby incorporated by reference.

Further, a dimmer switch used for controlling high-efficiency light sources have a smaller radio-frequency interference (RFI) capacitor than dimmer switches used for controlling traditional light sources (e.g., incandescent loads). The reduction in size of the RFI capacitor was done for a couple reasons. For example, the larger RFI capacitors would sometimes create a bias current that would cause the load regulation device to illuminate the controlled high-efficiency light source to a level that is perceptible by the human eye when the light source should be off. Further, and for example, the larger RFI capacitors tended to phase-shift the output current of the dimmer switch, and this phase-shift would interfere with start-up of the high-efficiency light source. As such, dimmer switches used for controlling high-efficiency light sources tend to have smaller RFI capacitors.

Additionally, the load regulation devices for the high-efficiency light sources may have high input impedances or input impedances that vary in magnitude throughout a half cycle. Therefore, when a prior-art forward phase-control dimmer switch is coupled between the AC power source and the load regulation device for the high-efficiency light source, the load control device may not be able to conduct enough current to exceed the rated latching and/or holding currents of the thyristor. In addition, when a prior-art reverse phase-control dimmer switch is coupled between the AC power source and the load regulation device, the magnitude of the charging current of the power supply may be great enough to cause the load regulation device to illuminate the controlled high-efficiency light source to a level that is perceptible by the human eye when the light source should be off.

The impedance characteristics of the load regulation device may negatively affect the magnitude of the phase-control voltage received by the load regulation device, such that the conduction time of the received phase-control voltage is different from the actual conduction time of the bidirectional semiconductor switch of the dimmer switch (e.g., if the load regulation device has a capacitive impedance). Therefore, the load regulation device may control the intensity of the high-efficiency light source to an intensity that is different than the desired intensity as directed by the dimmer switch. In addition, the charging current of the power supply of the dimmer switch may build up charge at the input of a load regulation device having a capacitive input impedance, thus negatively affecting the low-end intensity that may be achieved.

SUMMARY

As described herein, a load control device (e.g., a dimmer switch) for controlling an electrical load (e.g., a lighting load) may comprise a controllable filter circuit that may be controlled to adjust filtering characteristics of the controllable filter circuit based on one or more factors. The load control device may include a first terminal adapted to be coupled to an alternating-current (AC) power source, and a second terminal adapted to be coupled to the electrical load. The load control device may also include a bidirectional semiconductor switch (e.g., a thyristor) coupled in series between the first terminal and the second terminal. The bidirectional semiconductor switch may be configured to be controlled to a conductive state and a non-conductive state. The controllable filter circuit may be coupled between the first terminal and the second terminal. Further, the load control device may include a control circuit configured to render the bidirectional semiconductor switch conductive and non-conductive to control an amount of power delivered to the electrical load. The control circuit may be further configured to adjust an impedance (e.g., a capacitance and/or a resistance) of the controllable filter circuit. In some examples, the controllable filter circuit may be used for radio-frequency interference (RFI) filtering.

The controllable filter circuit may include one or more switches that may be controlled by the control circuit to adjust the impedance, and in turn the filtering characteristics, of the filter circuit. The controllable filter circuit may also be coupled between the bidirectional semiconductor switch and the second terminal of the load control device. The control circuit may be configured to adjust the impedance of the controllable filter circuit based on a state (e.g., a power state) of the bidirectional semiconductor switch, during a turn-on period after the load control device receives an input to provided power to the electrical load, and/or based on the amount of power delivered to the electrical load. The load control device may also comprise a measurement circuit configured to generate a feedback signal indicating a magnitude of a voltage developed across the load control device. The control circuit may be configured to measure a slope of the feedback signal when the bidirectional semiconductor switch is transitioning from the non-conductive state to the conductive state, and adjust the impedance of the controllable filter circuit in response to the slope of the feedback signal.

In addition, the filter circuit may include an inductor, one or more capacitors, one or more resistors, and/or one or more controllable switches. The inductor may be coupled in series between the bidirectional semiconductor switch and the second terminal. A capacitor and a switch of the filter circuit may be coupled in series between the first terminal and the second terminal, for example, such that the control circuit may be configured to render the switch conductive and non-conductive to take the capacitor in and out of series connection between the first terminal and the second terminal to adjust the impedance of the filter circuit.

DETAILED DESCRIPTION

Figure 1:
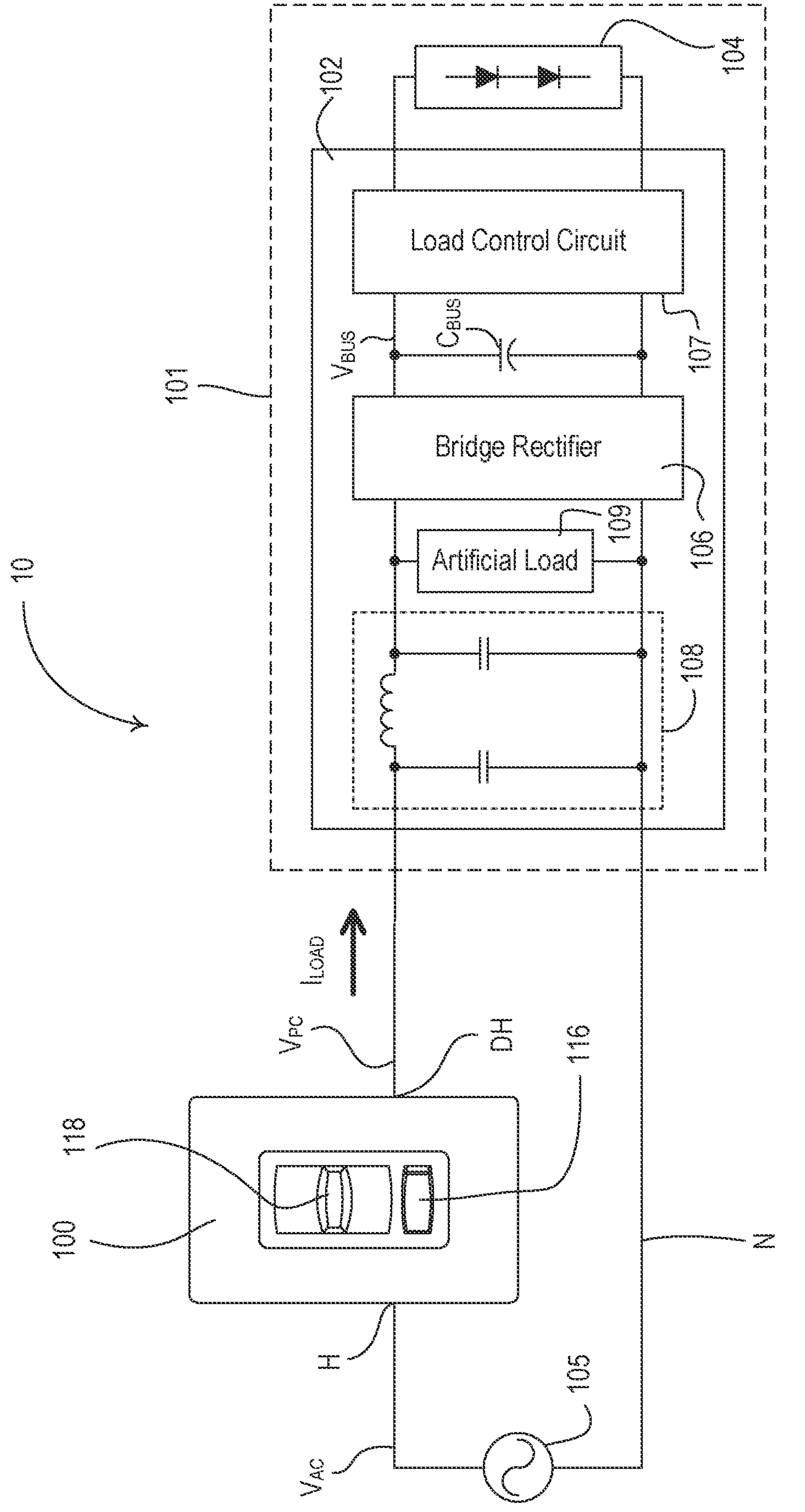
FIG. 1 is a simplified block diagram of an example lighting control system including a load control device (e.g., a "two-wire" dimmer switch) for controlling the intensity of a high-efficiency lighting load (e.g., an LED light source).

FIG. 1 is a simplified block diagram of an example load control system 10 (e.g., a lighting control system) including a load control device, e.g., "two-wire" dimmer switch 100, for controlling the amount of power delivered to an electrical load, e.g., a lighting load 101. The lighting load 101 may comprise any suitable dimmable lighting load, such as, for example, an incandescent lamp, a halogen lamp, an electronic low-voltage lighting load, a magnetic low-voltage lighting load, or other type of lighting load. In addition, as shown in FIG. 1, the lighting load 101 may comprise, for example, a high-efficiency lighting load including an internal load regulation device, e.g., a light-emitting diode (LED) driver 102, and a high-efficiency light source, e.g., an LED light source 104 (or "light engine"). The dimmer switch 100 may have a hot terminal H coupled to an alternating-current (AC) power source 105 for receiving an AC mains line voltage $V_{AC}$, and a dimmed-hot terminal DH coupled to the LED driver 102. The dimmer switch 100 may not require a direct connection to the neutral side N of the AC power source 105. The dimmer switch 100 may generate a phase-control voltage $V_{PC}$ (e.g., a dimmed-hot voltage) at the dimmed-hot terminal DH and conduct a load current $I_{LOAD}$ through the lighting load 101. The dimmer switch 100 may either use forward phase-control dimming or reverse phase-control dimming techniques to generate the phase-control voltage $V_{PC}$.

As defined herein, a "two-wire" dimmer switch or load control device does not require a require a direct connection to the neutral side N of the AC power source 105. In other words, all currents conducted by the two-wire dimmer switch will also be conducted through the load. A two-wire dimmer switch may have only two terminals (e.g., the hot terminal H and the dimmed hot terminal DH as shown in FIG. 1). Alternatively, a two-wire dimmer switch (as defined herein) may comprise a three-way dimmer switch that may be used in a three-way lighting system and may have at least three load terminals, but may not require a neutral connection. In addition, a two-wire dimmer switch may comprise an additional connection that may provide for communication with a remote control device (for remotely controlling the dimmer switch), but may not require the dimmer switch to be directly connected to neutral.

The LED driver 102 and the LED light source 104 may be both included together in a single enclosure, for example, having a screw-in base adapted to be coupled to a standard Edison socket. When the LED driver 102 is included with the LED light source 104 in the single enclosure, the LED driver may only have two electrical connections: to the dimmer switch 100 for receiving the phase-control voltage $V_{PC}$ and to the neutral side N of the AC power source 105. The LED driver 102 may comprise a rectifier bridge circuit 106 that may receive the phase-control voltage $V_{PC}$ and generate a bus voltage $V_{BUS}$ across a bus capacitor $C_{BUS}$. The LED driver 102 may further comprise a load control circuit 107 that may receive the bus voltage $V_{BUS}$ and control the intensity of the LED light source 104 in response to the phase-control signal $V_{PC}$. Specifically, the load control circuit 107 of the LED driver 102 may be configured to turn the LED light source 104 on and off and to adjust the intensity of the LED light source to a target intensity $L_{TRGT}$ (e.g., a desired intensity) in response to the phase-control signal $V_{PC}$. The target intensity $L_{TRGT}$ may range between a low-end intensity $L_{LE}$ and a high-end intensity $L_{HE}$. The LED driver 102 may also comprise a filter network 108 for preventing noise generated by the load control circuit 107 from being conducted on the AC mains wiring. Since the LED driver 102 comprises the bus capacitor $C_{BUS}$ and the filter network 108, the LED driver may have a capacitive input impedance. An example of the LED driver 102 is described in greater detail in U.S. Pat. No. 8,492,987, issued Jul. 23, 2013, entitled LOAD CONTROL DEVICE FOR A LIGHT-EMITTING DIODE LIGHT SOURCE, the entire disclosure of which is hereby incorporated by reference.

In addition, the LED driver 102 may comprise an artificial load circuit 109 for conducting current (in addition to the load current $I_{LOAD}$) through the dimmer switch 100. Accordingly, if the dimmer switch 100 includes a triac for generating the phase-control voltage $V_{PC}$, the artificial load circuit 109 may conduct enough current to ensure that the magnitude of the total current conducted through the triac of the dimmer switch 100 exceeds the rated latching and holding currents of the triac. In addition, the artificial load circuit 109 may conduct a timing current if the dimmer switch 100 comprises a timing circuit and may conduct a charging current if the dimmer switch comprises a power supply, such that these currents need not be conducted through the load control circuit 107 and do not affect the intensity of the LED light source 104.

The artificial load circuit 109 may simply comprise a constant impedance circuit (e.g., a resistor) or may comprise a current source circuit. Alternatively, the artificial load circuit 109 may be controllable, such that the artificial load circuit may be enabled and disabled to thus selectively conduct current through the dimmer switch 100. In addition, the artificial load circuit 109 may be controlled to conduct different amounts of current depending upon the magnitude of the AC mains line voltage $V_{AC}$, the present time during a half cycle of the AC mains line voltage, or the present operating mode of the LED driver 102. Examples of artificial load circuits are described in greater detail in commonly-assigned U.S. Pat. No. 8,169,154, issued May 1, 2012, entitled VARIABLE LOAD CIRCUITS FOR USE WITH LIGHTING CONTROL DEVICES, and U.S. Patent Application Publication No. 2011/0121744, published May 26, 2011, entitled CONTROLLABLE-LOAD CIRCUIT FOR USE WITH A LOAD CONTROL DEVICE, the entire disclosures of which are hereby incorporated by reference.

Alternatively, the high-efficiency light source could comprise a compact fluorescent lamp (CFL) and the load regulation device could comprise an electronic dimming ballast. In addition, the dimmer switch 100 could alternatively control the amount of power delivered to other types of electrical loads, for example, by directly controlling a lighting load or a motor load. An example of a screw-in light source having a fluorescent lamp and an electronic dimming ballast is described in greater detail in U.S. Pat. No. 8,803,436, issued Aug. 12, 2014, entitled DIMMABLE SCREW-IN COMPACT FLUORESCENT LAMP HAVING INTEGRAL ELECTRONIC BALLAST CIRCUIT, the entire disclosure of which is hereby incorporated by reference.

The dimmer switch 100 may comprise a user interface having a rocker switch 116 and an intensity adjustment actuator 118 (e.g., a slider knob as shown in FIG. 1). The rocker switch 116 may allow for turning on and off the LED light source 104, while the intensity adjustment actuator 118 may allow for adjustment of the target intensity $L_{TRGT}$ of the LED light source 104 from the low-end intensity $L_{LE}$ to the high-end intensity $L_{HE}$. Examples of user interfaces of dimmer switches are described in greater detail in commonly-assigned U.S. Pat. No. 8,049,427, issued Nov. 1, 2011, entitled LOAD CONTROL DEVICE HAVING A VISUAL INDICATION OF ENERGY SAVINGS AND USAGE INFORMATION, the entire disclosure of which is hereby incorporated by reference.

Figure 2:
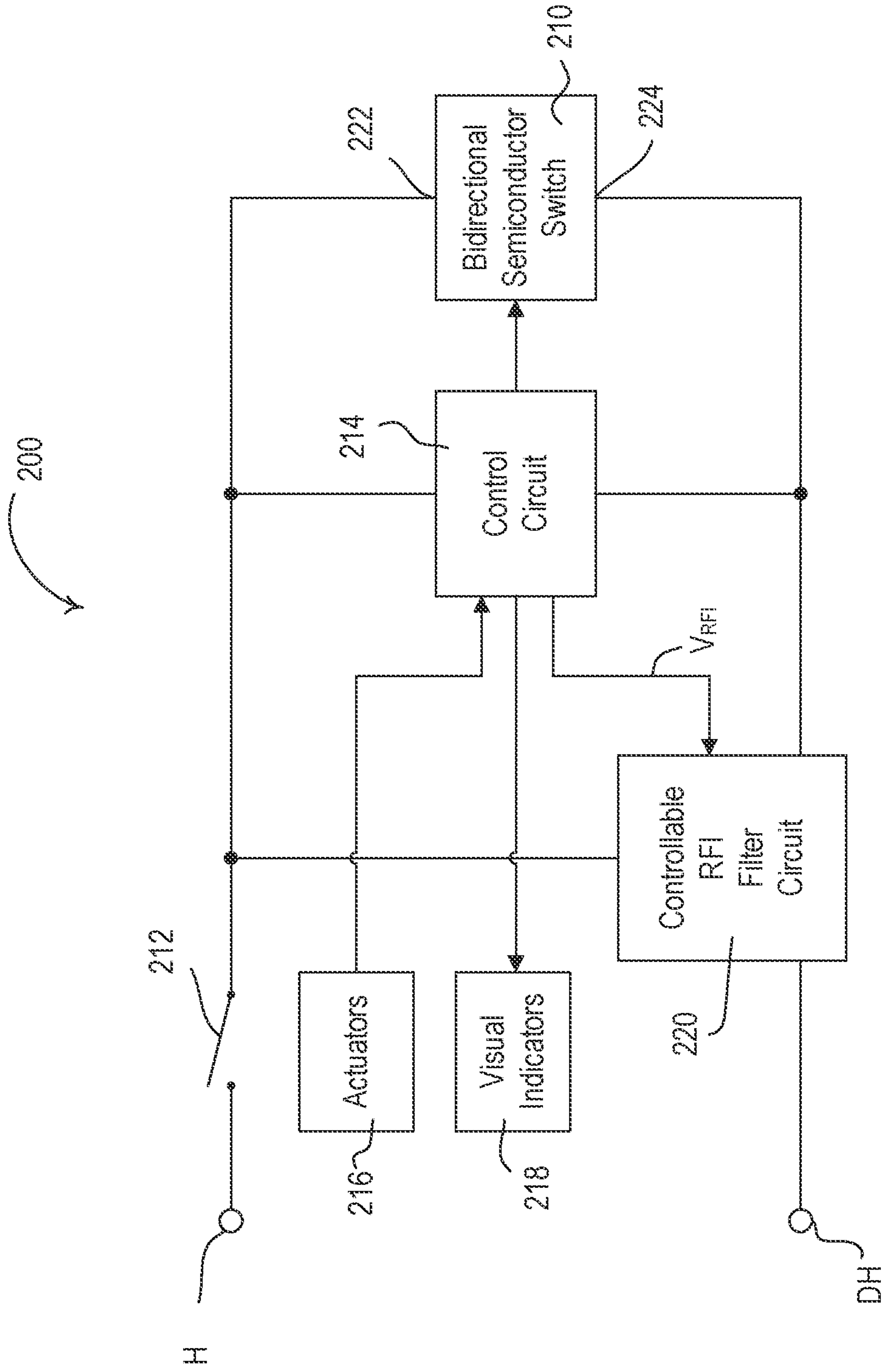
FIG. 2 is a simplified block diagram of an example dimmer switch.

FIG. 2 is a simplified block diagram of an example dimmer switch 200, which may be deployed as the dimmer switch 100 of FIG. 1. The dimmer switch 200 may comprise a bidirectional semiconductor switch 210, such as a thyristor (e.g., a triac and/or one or more silicon-controlled rectifiers (SCRs)), a field-effect transistor (FET) in a full-wave rectifier bridge, two FETs in anti-series connection, one or more insulated-gate bipolar junction transistors (IGBTs), or other suitable switching circuit. The bidirectional semiconductor switch 210 may be coupled between a hot terminal H and a dimmed hot terminal DH for generating a phase-control voltage $V_{PC}$ and conducting a load current $I_{LOAD}$ through an electrical load (e.g., the lighting load 101 shown in FIG. 1) for controlling of the amount of power delivered to the electrical load. The bidirectional semiconductor switch 210 may comprise a first main terminal 222 electrically coupled to the hot terminal H and a second main terminal electrically 224 coupled to the dimmed-hot terminal DH.

The dimmer switch 200 may comprise a mechanical air-gap switch 212 electrically coupled to the hot terminal H and in series with the bidirectional semiconductor switch 210. When the air-gap switch 212 is open, the electrical load may be turned off. When the air-gap switch 212 is closed, the dimmer switch 200 may be configured to control the bidirectional semiconductor switch 210 to control the amount of power delivered to the electrical load. The air-gap switch 212 may be mechanically coupled to an actuator of a user interface of the dimmer switch 200 (e.g., the rocker switch 116), such that the switch may be opened and closed in response to actuations of the actuator.

The dimmer switch 200 may comprise a control circuit 214 configured to control the bidirectional semiconductor switch 210 using a phase-control technique (e.g., a forward or reverse phase-control technique) to control the amount of power delivered to the electrical load (e.g., to control the intensity of the lighting load 101). When using the forward phase-control technique, the control circuit 214 may render the bidirectional semiconductor switch 210 conductive at a firing time (e.g., at a firing angle) each half cycle of the AC power source. The control circuit 214 may be configured to adjust the firing time from one half-cycle to the next to control a target intensity $L_{TRGT}$ from a minimum intensity $L_{MIN}$ (e.g., approximately 1%) to a maximum intensity $L_{MAX}$ (e.g., approximately 100%).

The dimmer switch 200 may comprise one or more actuators 216 (e.g., the rocker switch 116 and an intensity adjustment actuator 118 of the dimmer switch 100 shown in FIG. 1) for receiving user inputs and/or one or more visual indicators 218 for providing feedback to a user of the dimmer switch. The control circuit 214 may be configured to control the bidirectional semiconductor switch 210 in response to actuations of one or more of the actuators 216 (e.g., to turn the lighting load 101 on and off and/or adjust the intensity of the lighting load 101). The control circuit 214 may be configured to illuminate or more of the visual indicators 218 to provide feedback to the user (e.g., feedback indicating the status and/or intensity level of the lighting load 101).

The dimmer switch 200 may comprise a controllable radio-frequency interference (RFI) filter circuit 220. The controllable RFI filter circuit 220 may be electrically coupled between the hot terminal H and the dimmed hot terminal DH. For example, the controllable RFI filter circuit 220 may comprise one or more filter components (e.g., one or more filter capacitors) coupled between the hot terminal H and the dimmed hot terminal DH. In addition, the controllable RFI filter circuit 220 may be coupled between the second main terminal 224 of the bidirectional semiconductor switch 210 and the dimmed hot terminal DH. For example, the controllable RFI filter circuit 220 may comprise one or more filter components (e.g., one or more filter inductors or chokes) in series with the bidirectional semiconductor switch 210 (e.g., in series with the second main terminal 224 of the bidirectional semiconductor switch).

The control circuit 214 may be coupled to the controllable RFI filter circuit 220 for controlling filtering characteristics of the controllable RFI filter circuit 220 (e.g., an impedance or impedance level of the controllable RFI filter circuit between the hot terminal H and the dimmed hot terminal DH and/or an impedance or impedance level of the controllable RFI filter circuit in series with the bidirectional semiconductor switch). For example, the control circuit 214 may be configured to control the controllable RFI filter circuit 220 to connect and disconnect a filter capacitor coupled between the hot terminal H and the dimmed hot terminal DH. In addition, the control circuit 214 may be configured to control the controllable RFI filter circuit 220 to adjust the capacitance of a filter capacitor coupled between the hot terminal H and the dimmed hot terminal DH.

The control circuit 214 may control the controllable RFI filter circuit 220 to operate as an LC filter circuit (e.g., an inductor-capacitor filter circuit) or as an RLC filter circuit (e.g., a resistor-capacitor-inductor filter circuit). The controllable RFI filter circuit 220 may be configured as an LC filter circuit if the controllable RFI filter circuit 220 comprises an inductive circuit (e.g., one or more filter inductors) and a capacitive circuit (e.g., one or more filter capacitors). For example, the control circuit 214 may be configured to control the controllable RFI filter circuit 220 to connect the capacitive circuit between the hot terminal H and the dimmed hot terminal DH and/or to connect the inductive circuit between the dimmed hot terminal DH and the bidirectional semiconductor switch. The controllable RFI filter circuit 220 may also include a resistive circuit (e.g., one or more filter resistors), and for example, the control circuit 214 may be configured to control the controllable RFI filter circuit 220 to controllably connect and disconnect the resistive circuit from series connection with the capacitive circuit. If the resistive circuit is coupled in series with the capacitive circuit between the hot terminal H and the dimmed hot terminal DH, and the inductive circuit is coupled between the dimmed hot terminal DH and the bidirectional semiconductor switch, the controllable RFI filter circuit 220 may be configured as an RLC filter circuit.

The control circuit 214 may be configured to control the controllable RFI filter circuit 220 in response to the state (e.g., the power state) of the electrical load. For example, the control circuit 214 may be configured to connect and/or increase the capacitance of the capacitive circuit between the hot terminal H and the dimmed hot terminal DH when the electrical load is on (e.g., when the electrical load is in a first power state), and disconnect and/or decrease the capacitance of the capacitive circuit between the hot terminal H and the dimmed hot terminal DH when the electrical load is off (e.g., when the electrical load is in a second power state).

In addition, the control circuit 214 may be configured to control the controllable RFI filter circuit 220 to provide a different impedance between the hot terminal H and the dimmed hot terminal DH while the dimmer switch 200 is turning on the lighting load (e.g., during a turn-on sequence) than while the dimmer switch 200 is in a steady state condition. For example, the control circuit 214 may be configured to disconnect and/or decrease the capacitance of the capacitive circuit between the hot terminal H and the dimmed hot terminal DH during a turn-on period (e.g., a predetermined amount of time) after the air-gap switch 212 is closed to turn on the lighting load, and connect and/or increase the capacitance of the capacitive circuit between the hot terminal H and the dimmed hot terminal DH after the turn-on period (e.g., at the end of the turn-on period).

The control circuit 214 may be configured to control the controllable RFI filter circuit 220 to provide a different impedance between the hot terminal H and the dimmed hot terminal DH during different portions of the dimming range of the dimmer switch 200. For example, the control circuit 214 may to connect and/or increase the capacitance of the capacitive circuit between the hot terminal H and the dimmed hot terminal DH near the middle of the dimming range (e.g., when the target intensity $L_{TRGT}$ between 25% and 75%), and disconnect and/or decrease the capacitance of the capacitive circuit between the hot terminal H and the dimmed hot terminal DH during the other portions of the dimming range (e.g., when the target intensity $L_{TRGT}$ less than 25% and greater than 75%). That is, the control circuit may determine if the intensity level $L_{TRGT}$ is between a low intensity threshold $L_{LOW}$ (e.g., 25% intensity) and a high intensity threshold $L_{HIGH}$ (e.g., 75% intensity), and increase the capacitance of the capacitive circuit between the hot terminal H and the dimmed hot terminal DH.

Figure 3:
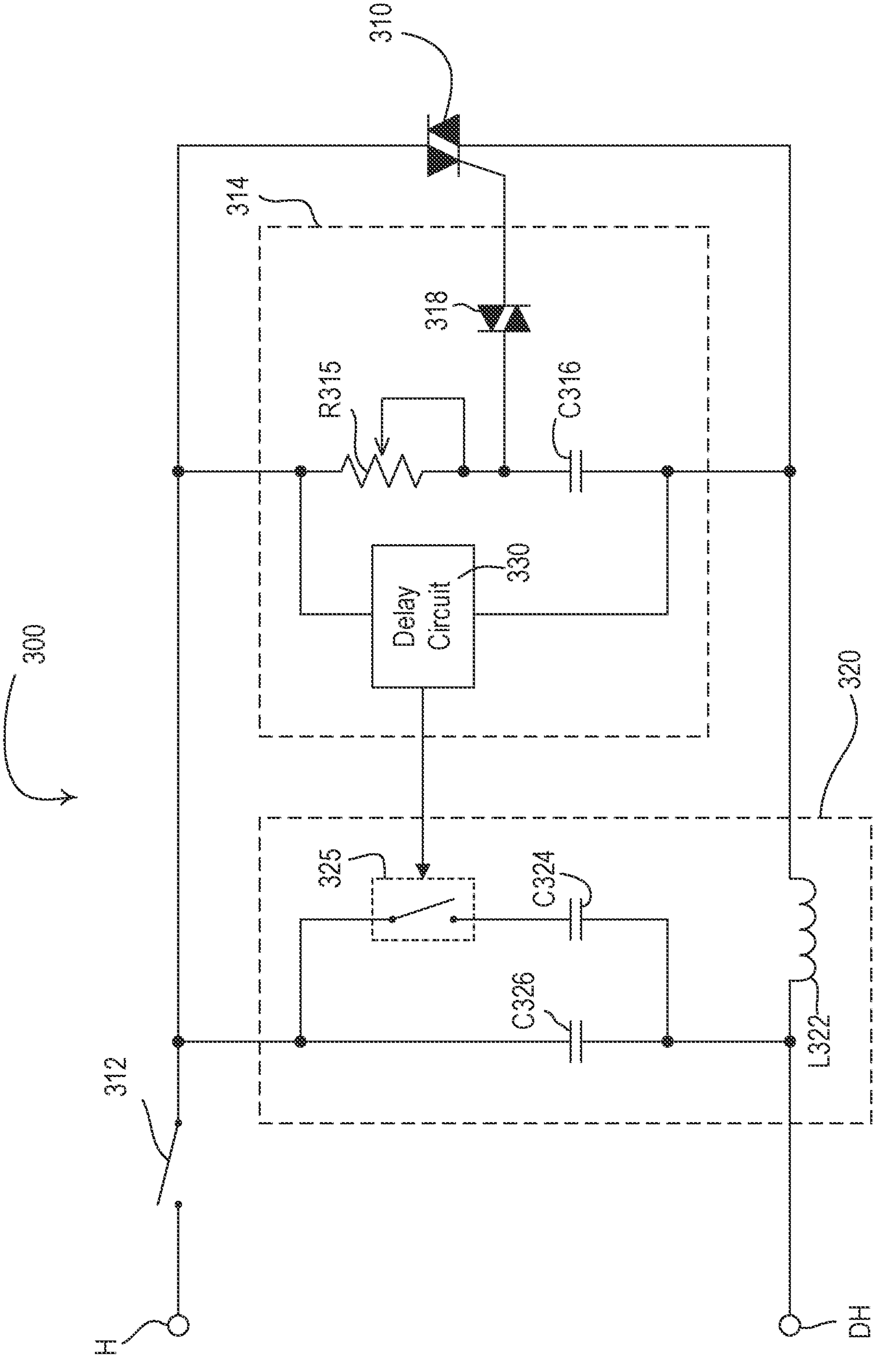
FIGS. 3 and 4 are simplified schematic diagrams of example dimmer switches.

FIG. 3 is a simplified block diagram of another example dimmer switch 300 (e.g., an analog dimmer switch), which may be deployed as the dimmer switch 100 of FIG. 1 and/or the dimmer switch 200 of FIG. 2. The dimmer switch 300 may comprise a bidirectional semiconductor switch, e.g., a thyristor, such as, a triac 310, which may be coupled between a hot terminal H and a dimmed hot terminal DH. The triac 310 may comprise a first main terminal electrically coupled to the hot terminal H and a second main terminal electrically coupled to the dimmed-hot terminal DH. The triac 310 may comprise a gate terminal (e.g., a control input), which may receive control signals for rendering the triac conductive. Alternatively, the bidirectional semiconductor switch of the dimmer switch 300 may comprise a field-effect transistor (FET) in a rectifier bridge, two FETs electrically coupled in anti-series connection, and/or one or more insulated gate bipolar junction transistors (IGBTs).

The dimmer switch 300 may comprise a mechanical air-gap switch 312 electrically coupled to the hot terminal H and in series with the triac 310, such that the electrical load may be turned off when the switch is open. The air-gap switch 312 may be mechanically coupled to an actuator of a user interface of the dimmer switch 300 (e.g., the rocker switch 116), such that the switch may be opened and closed in response to actuations of the actuator.

When the air-gap switch 312 is closed, the triac 310 may be controlled to generate a phase-control voltage $V_{PC}$ (e.g., a forward phase-control voltage) and conduct a load current $I_{LOAD}$ through an electrical load (e.g., the lighting load 101 shown in FIG. 1) for controlling of the amount of power delivered to the electrical load. The triac 310 may become non-conductive when the magnitude of the load current $I_{LOAD}$ conducted through the triac drops below a rated holding current of the triac. The phase-control voltage $V_{PC}$ may have a magnitude approximately equal to zero volts at the beginning of each half cycle during a non-conduction time $T_{NC}$, and may have a magnitude approximately equal to the magnitude of the AC line voltage $V_{AC}$ of the AC power source 105 during the rest of the half cycle, e.g., during a conduction time $T_{CON}$.

The dimmer switch 300 may comprise a control circuit 314 (e.g., an analog control circuit) for controlling the triac 310. The control circuit 314 may be coupled in parallel with the triac 310 (e.g., coupled between the first and second main terminals of the triac 310). The control circuit 314 may comprise a timing circuit including a potentiometer R315 and a capacitor C316 that are coupled in series between the first and second main terminals of the triac 310. The junction of the potentiometer R315 and the capacitor C316 may be coupled to the gate of the triac 310 through a triggering circuit, such as a diac 318. The wiper of the potentiometer R315 may be coupled to the junction of the potentiometer and the capacitor C316, such that the potentiometer R315 provides a variable resistance between the first main terminal of the triac 310 and the capacitor C316. The position of the wiper of the potentiometer R315 may be adjusted by an intensity adjustment actuator of the dimmer switch 300 (e.g., the intensity adjustment actuator 118 of the dimmer switch 100 shown in FIG. 1). The capacitor C316 begins to charge through the potentiometer R315 at the beginning of each half-cycle. When the voltage across the capacitor C316 exceeds a breakover voltage of the diac 318 (e.g., at the firing time), the diac may be configured to conduct a pulse of gate current through the gate of the triac 310, thus rendering the triac conductive. The rate at which the capacitor C316 charges, and thus the firing time of the triac 310 may be adjusted by varying the resistance provided by the potentiometer R315 between the first main terminal of the triac 310 and the capacitor C316.

The dimmer switch 300 may further comprise a controllable RFI filter circuit 320. The controllable RFI filter circuit 320 may comprise an inductor L322 (e.g., a filter inductor or choke) coupled in series with the second main terminal of the triac 310. The controllable RFI filter circuit 320 may comprise a first capacitor C324 (e.g., a first filter capacitor) and a controllable switch 325 that are electrically coupled in series between the hot terminal H and the dimmed hot terminal DH. The control circuit 314 may be configured to render the controllable switch 325 conductive and non-conductive to respectively connect and disconnect the first capacitor C324 from the series connection between the hot terminal H and the dimmed hot terminal DH. The controllable switch 325 may be a single transistor (e.g., a FET), an optocoupler, a relay, or another type of controllable switching circuit. For example, if the controllable switch 325 comprises a single FET, the FET may be rendered non-conductive to prevent the first capacitor C324 from charging during the positive half-cycles. In the negative half-cycles, the first capacitor C324 may be configured to charge through the body diode of the FET, but may not discharge since the FET is non-conductive. As a result, the first capacitor C324 may charge to approximately the negative peak of the AC mains line voltage $V_{AC}$ and a magnitude of a leakage current conducted through the lighting load may be approximately zero amps.

The controllable RFI filter circuit 320 may further comprise a second capacitor C326 (e.g., a second filter capacitor) coupled between the hot terminal H and the dimmed hot terminal DH and in parallel with the series combination of the first capacitor C324 and the controllable switch 325. The control circuit 314 may be configured to render the controllable switch 325 non-conductive to control the capacitance between the hot terminal H and the dimmed hot terminal DH to a first value (e.g., by only coupling the second capacitor C326 between the hot terminal H and the dimmed hot terminal DH). The control circuit 314 may be configured to render the controllable switch 325 conductive to control (e.g., increase) the capacitance between the hot terminal H and the dimmed hot terminal DH to a second value (e.g., by coupling the first and second capacitors C324, C326 in parallel between the hot terminal H and the dimmed hot terminal DH). The first capacitor C324, the controllable switch 325, and the second capacitor C326 may form a capacitive circuit, e.g., a controllable capacitive circuit.

The control circuit 314 may be configured to control the controllable switch 325 of the controllable RFI filter circuit 320 in response to the state of the electrical load (e.g., the state of the triac 310). For example, the control circuit 314 may be configured to adjust the capacitance provided between the hot terminal H and the dimmed hot terminal DH during a turn-on period after the air-gap switch 312 is closed to turn on the electrical load. For example, the control circuit 314 may be configured to render the controllable switch 325 non-conductive to couple just the second capacitor C326 between the hot terminal H and the dimmed hot terminal DH during the turn-on period after the air-gap switch 312 is closed. The control circuit 314 may be configured to render the controllable switch 325 conductive to couple the first and second capacitors C324, C326 in parallel between the hot terminal H and the dimmed hot terminal DH after the end of the turn-on period (e.g., when the dimmer switch 300 is in a steady-state condition).

The control circuit 314 comprise a delay circuit 330 configured to render the controllable switch 325 conductive after the turn-on period. The delay circuit 330 between the first and second main terminals of the triac 310 and may be responsive to the voltage generated across the triac 310. When the triac 310 is rendered conductive, the voltage across the triac 310 may drop to a small voltage (e.g., approximately one volt) at which time the delay circuit 330 may begin the turn-on period. At the end of the turn-on period, the delay circuit 330 may render the controllable switch 325 conductive to couple the first and second capacitors C324, C326 in parallel between the hot terminal H and the dimmed hot terminal DH.

The second capacitor C326 may be optional. For example, if the second capacitor C326 is not included in the controllable RFI filter circuit 320, the control circuit 314 may be configured to render the controllable switch 325 non-conductive to provide no capacitance between the hot terminal H and the dimmed hot terminal DH and conductive to provide some capacitance between the hot terminal H and the dimmed hot terminal DH (e.g., the capacitance of the capacitor C324). The control circuit 314 may be configured to control the controllable switch 325 of the controllable RFI filter circuit 320 in response to the delay circuit 330. For example, the control circuit 314 may be configured to adjust the capacitance provided between the hot terminal H and the dimmed hot terminal DH during a turn-on period after the air-gap switch 312 is closed to turn on the electrical load. For example, the control circuit 314 may be configured to render the controllable switch 325 non-conductive to disconnect the first capacitor C324 during the turn-on period after the air-gap switch 312 is closed. The control circuit 314 may be configured to render the controllable switch 325 conductive to couple the first capacitor C324 between the hot terminal H and the dimmed hot terminal DH after the end of the turn-on period.

The control circuit 314 may be configured to control the controllable RFI filter circuit 320 to provide a different impedance between the hot terminal H and the dimmed hot terminal DH during different portions of the dimming range of the dimmer switch 300. For example, the control circuit may include additional circuitry (not shown) configured to determine if the intensity level $L_{TRGT}$ is between a low intensity threshold $L_{LOW}$ (e.g., 25% intensity) and a high intensity threshold $L_{HIGH}$ (e.g., 75% intensity). The control circuit 314 may close the controllable switch 325 to connect the capacitor C324 between the hot terminal H and the dimmed hot terminal DH to increase the capacitance when the intensity level $L_{TRGT}$ is between the low intensity threshold $L_{LOW}$ and the high intensity threshold $L_{HIGH}$ (e.g., near the middle of the dimming range). The control circuit may open the controllable switch 325 to disconnect the capacitor C324 between the hot terminal H and the dimmed hot terminal DH to decrease the capacitance when the intensity level $L_{TRGT}$ is not between the low intensity threshold $L_{LOW}$ (e.g., 25% intensity) and the high intensity threshold $L_{HIGH}$ (e.g., during the other portions of the dimming range).

Figure 4:
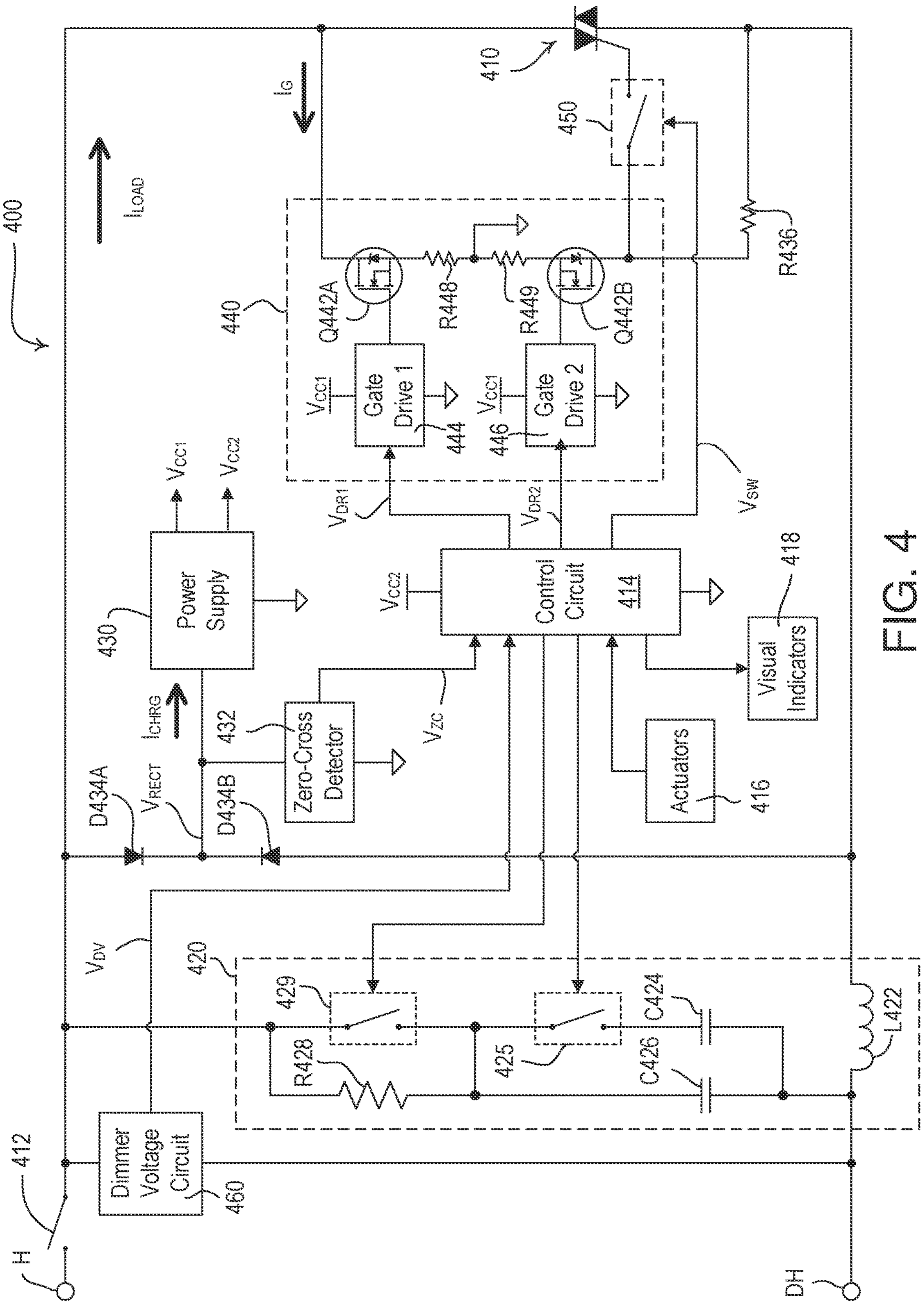

FIG. 4 is a simplified block diagram of another example dimmer switch 400 (e.g., a digital or "smart" dimmer switch), which may be deployed as the dimmer switch 100 of FIG. 1 and/or the dimmer switch 200 of FIG. 2. The dimmer switch 400 may comprise a bidirectional semiconductor switch, e.g., a thyristor, such as, a triac 410, which may be coupled between a hot terminal H and a dimmed hot terminal DH. The hot terminal H may receive a hot voltage $V_H$ from an AC power source (e.g., the AC power source 105). The triac 410 may comprise a first main terminal electrically coupled to the hot terminal H and a second main terminal electrically coupled to the dimmed-hot terminal DH. The triac 410 may comprise a gate terminal (e.g., a control input), which may receive control signals for rendering the triac conductive. Alternatively, the bidirectional semiconductor switch of the dimmer switch 400 may comprise a field-effect transistor (FET) in a rectifier bridge, two FETs electrically coupled in anti-series connection, and/or one or more insulated gate bipolar junction transistors (IGBTs).

The dimmer switch 400 may comprise a mechanical air-gap switch 412 electrically coupled to the hot terminal H and in series with the triac 410, such that the electrical load may be turned off when the switch is open. The air-gap switch 412 may be mechanically coupled to an actuator of a user interface of the dimmer switch 400, such that the switch may be opened and closed in response to actuations of the actuator.

When the air-gap switch 412 is closed, the triac 410 may be controlled to generate a phase-control voltage $V_{PC}$ (e.g., a forward phase-control voltage) and conduct a load current $I_{LOAD}$ through an electrical load (e.g., the lighting load 101 shown in FIG. 1) for controlling of the amount of power delivered to the electrical load. The triac 410 may become non-conductive when the magnitude of the load current $I_{LOAD}$ conducted through the triac drops below a rated holding current of the triac. The phase-control voltage $V_{PC}$ may have a magnitude approximately equal to zero volts at the beginning of each half cycle during a non-conduction time $T_{NC}$, and may have a magnitude approximately equal to the magnitude of the AC line voltage $V_{AC}$ of the AC power source 105 during the rest of the half cycle, e.g., during a conduction time $T_{CON}$.

The dimmer switch 400 may comprise a control circuit 414, e.g., a digital control circuit having a processor, such as, a microprocessor, a programmable logic device (PLD), a microcontroller, an application specific integrated circuit (ASIC), a field-programmable gate array (FPGA), or any suitable controller or processing device. The control circuit 414 may be responsive to actuators 416 (e.g., the rocker switch 116 and/or the intensity adjustment actuator 118). The dimmer switch 400 may comprise a memory (not shown) configured to store operational characteristics of the dimmer switch (e.g., a low-end intensity $L_{LE}$, a high-end intensity $L_{HE}$, etc.). The memory may be implemented as an external integrated circuit (IC) or as an internal circuit of the control circuit 414.

The processor of the control circuit 414 may enable the dimmer switch 400 to offer advanced features and functionality to a user. For example, the user may be able adjust the features and functionality of the dimmer switch 400 using an advanced programming mode. The control circuit 414 may be configured to enter the advanced programming mode in response to one or more actuations of the actuators 416. For example, the user may adjust the low-end intensity $L_{LE}$ and the high-end intensity $L_{HE}$ between which the control circuit 320 may control the target intensity $L_{TRGT}$ of the LED light source 104. A dimmer switch having an advanced programming mode is described in greater detail in commonly-assigned U.S. Pat. No. 7,190,125, issued Mar. 13, 2007, entitled PROGRAMMABLE WALLBOX DIMMER, the entire disclosure of which is hereby incorporated by reference. In addition, the operation of the dimmer switch 400 may be configured using an external programming device (such as a smart phone, a tablet, or a laptop) as described in greater detail in commonly-assigned U.S. Pat. No. 9,544,977, issued Jan. 10, 2017, entitled METHOD OF PROGRAMMING A LOAD CONTROL DEVICE USING A SMART PHONE, the entire disclosure of which is hereby incorporated by reference.

The dimmer switch 400 may comprise a power supply 430 configured to conduct a charging current $I_{CHRG}$ through the electrical load (e.g., the LED driver 102) for generating a first DC supply voltage $V_{CC1}$ (e.g., approximately 8 volts) and a second DC supply voltage $V_{CC2}$ (e.g., approximately 4 volts) for powering the control circuit 414. Both of the first and second DC supply voltages $V_{CC1}$, $V_{CC2}$ may be referenced to a circuit common and the power supply 430 may conduct the charging current $I_{CHRG}$ through circuit common. For example, the power supply 430 may comprise a resistor-zener power supply for generating the first DC supply voltage $V_{CC1}$ and a high-efficiency switching power supply for generating the second DC supply voltage $V_{CC2}$. Alternatively, the power supply 430 may comprise one or more linear regulators, or other suitable power supply, in addition to any combination of linear regulators, switching power supplies, and resistor-zener power supplies. As shown in FIG. 4, the dimmer switch 400 may not comprise a neutral terminal (e.g., to be coupled to the neutral side N of the AC power source 105) thus requiring that the power supply 430 conducts the charging current $I_{CHRG}$ through the electrical load. The power supply 430 also does not conduct any portion of the charging current $I_{CHRG}$ through an earth ground connection as shown in FIG. 4.

The dimmer switch 400 may also comprise a zero-cross detect circuit 432 that may generate a zero-cross signal $V_{ZC}$ that indicates the zero-crossings of the AC line voltage. Since the dimmer switch 400 may not comprise a neutral connection and/or an earth ground connection, the zero-cross detect circuit 432 may be coupled between the hot terminal H and the dimmed-hot terminal DH and may be responsive to a dimmer voltage $V_{DIM}$ (e.g., the voltage across the dimmer switch 400). The zero-cross detect circuit 432 may be configured to drive the zero-cross signal $V_{ZC}$ low towards circuit common when the magnitude of the dimmer voltage $V_{DIM}$ rises above a zero-cross threshold (e.g., approximately 30 volts) during the positive half-cycles of the AC power source. The control circuit 414 may receive the zero-cross signal $V_{ZC}$ and may determine when to render the triac 410 conductive each half cycle based on the indications of the zero-crossings from the zero-cross signal. The control circuit 414 may sample the zero-cross signal $V_{ZC}$ during a zero-cross window once every line cycle (or every half cycle) to look for an indication of a zero-crossing. For example, a falling edge of the zero-cross signal $V_{ZC}$ at the beginning of the positive half-cycles may indicate a zero-crossing of the AC power source. The control circuit 414 may determine when to sample the zero-cross signal $V_{ZC}$ during a zero-cross window based on a previous zero-crossing time (e.g., approximately the period of one line cycle from the previous zero-crossing time). If the control circuit 414 does not detect an indication of a zero-crossing in a predetermined number of sequential line cycles (e.g., approximately three line cycles), the control circuit may reset.

The dimmer switch 400 may also comprise a neutral terminal (not shown) adapted to be coupled to a neutral connection (e.g., the neutral side of the AC power source). For example, the power supply 430 may be coupled between the hot terminal H and the neutral terminal, such that the power supply may not conduct the charging current $I_{CHRG}$ through the electrical load. In addition, the dimmer switch 400 may comprise a neutral terminal zero-cross detect circuit (not shown) that may be coupled between the hot terminal H and the neutral terminal for generating a zero-cross signal indicating the zero-crossings of the AC power source.

If the dimmer switch 400 comprises a neutral terminal, the dimmer switch 400 may comprise both the zero-cross detect circuit 432 coupled between the hot terminal and the dimmed hot terminal and the neutral terminal zero-cross detect circuit coupled between the hot terminal H and the neutral terminal. The dimmer switch 400 may be configured to determine if the neutral terminal is electrically connected to the neutral side of the AC power source in response to the neutral terminal zero-cross detect circuit. The dimmer switch 400 may be configured to operate in a two-wire mode in which the control circuit 414 is responsive to the zero-cross circuit 432 coupled between the hot terminal H and the dimmed hot terminal DH, and in a three-wire mode in which the control circuit is responsive to the neutral terminal zero-cross detect circuit (e.g., in response to determine that the neutral terminal is connected to the neutral side of the AC power source). An example of a dimmer switch configured to operate in two-wire and three-wire modes of operation is described in greater detail in commonly-assigned U.S. Pat. No. 7,859,815, issued Dec. 28, 2010, entitled ELECTRONIC CONTROL SYSTEMS AND METHODS, the entire disclosure of which is hereby incorporated by reference.

The dimmer switch 400 may also comprise an earth ground terminal (not shown) adapted to be coupled to an earth ground connection. For example, the power supply 430 may be coupled between the hot terminal H and the earth ground terminal for leaking at least a portion of the charging current $I_{CHRG}$ through the earth ground connection (e.g., the power supply may not conduct any of the charging current $I_{CHRG}$ through the electrical load). In addition, the dimmer switch 400 may comprise an earth ground terminal zero-cross detect circuit (not shown) that may be coupled between the hot terminal H and the earth ground terminal for generating a zero-cross signal indicating the zero-crossings of the AC power source.

The dimmer switch 400 may comprise a gate coupling circuit 440 and a controllable switching circuit 450 electrically coupled in series between the control circuit 414 and the gate terminal of the triac 410. The gate coupling circuit 440 and the controllable switching circuit 450 may operate as a gate current path for conducting pulses of gate current IG through the gate terminal of the triac 410 to render the triac conductive.

The gate coupling circuit 440 may comprise a voltage-controlled controllably conductive device, such as two MOS-gated transistors (e.g., FETs Q442A, Q442B) coupled in anti-series connection between the gate and a first one of the main terminals of the triac 410 (e.g., the hot terminal H of the dimmer switch). The FETs Q442A, Q442B may comprise MOSFETs or may alternatively be replaced by any suitable voltage-controlled semiconductor switches, such as, for example, IGBTs. The sources of the FETs Q442A, Q442B may be coupled together through two source resistors R448, R449 (e.g., each having a resistance of approximately 10Ω). The source resistors R448, R449 may operate to limit the magnitude of the gate current IG conducted through the gate of the triac 410 to a maximum gate current (e.g., approximately 0.6 amp). The junction of the source resistors R448, R449 may provide the circuit common for the power supply 430 to allow the power supply to conduct the charging current $I_{CHRG}$ through the electrical load.

The gate coupling circuit 440 may comprise first and second gate drive circuits 444, 446 that allow for independent control the FETs Q442A, Q442B. The control circuit 320 may generate two drive signals $V_{DR1}$, $V_{DR2}$ that are received by the respective gate drive circuits 340, 350 for rendering the respective FETs Q442A, Q442B conductive and non-conductive, such that the triac 410 may be rendered conductive to conduct the load current $I_{LOAD}$ to the electrical load. For example, the control circuit 414 may drive the respective drive signals $V_{DR1}$, $V_{DR2}$ high towards the second supply voltage $V_{CC2}$ to render the respective gate drive circuits 444, 446 conductive. The dimmer switch 400 may further comprise a full-wave rectifier bridge that may include the body diodes of the FETs Q442A, Q442B and diodes D434A, D434B, and may generate the rectified voltage VRECT that is received by the control circuit 414 and the power supply 430.

The control circuit 414 may generate a switch control signal $V_{SW}$ for rendering the controllable switching circuit 450 conductive and non-conductive. When the controllable switching circuit 450 is conductive, the control circuit 414 may render the FETs Q442A, Q442B conductive to allow the gate coupling circuit 440 to conduct a pulse of gate current IG through the gate terminal of the triac 410 to render the triac conductive, e.g., at the firing time each half cycle as determined with respect to the previous zero-crossing of the AC line voltage. When operating in the pulse gate drive mode, the control circuit 414 may control the drive signals $V_{DR1}$, $V_{DR2}$ to render both of the FETs Q332A, Q332B non-conductive (e.g., after the short pulse time period $T_{PULSE}$).

The dimmer switch 400 may comprise a resistor R436, which may have a resistance of, for example, approximately 90.9Ω and may be coupled between the gate and a second one of the main terminals of the triac 410 (e.g., to the dimmed hot terminal DH of the dimmer switch). The gate coupling circuit 440 and the resistor R338 may operate as an alternate path for conducting the load current $I_{LOAD}$. When operating in the constant gate drive mode, the control circuit 414 may be configured to control the FETs Q442A, Q442B of the gate coupling circuit 440 to conduct the load current $I_{LOAD}$ to the electrical load after the triac 410 becomes non-conductive and before the end of the present half cycle. The control circuit 414 may be configured to render the controllable switching circuit 450 non-conductive to disconnect the gate terminal of the triac 410 from the FETs Q442A, Q442B of the gate coupling circuit 440 before the end of each half cycle of the AC line voltage, such that the triac is able to commutate off before the end of the half cycle.

The dimmer switch 400 may further comprise a controllable RFI filter circuit 420. The controllable RFI filter circuit 420 may comprise an inductor L422 (e.g., a filter inductor or choke) coupled in series with the second main terminal of the triac 410. The controllable RFI filter circuit 420 may comprise a first capacitor C424 (e.g., a first filter capacitor) electrically coupled in series a first controllable switch 425. The controllable RFI filter circuit 420 may also comprise a second capacitor C426 (e.g., a second filter capacitor), which may be coupled in parallel with the series combination of the first capacitor C324 and the first controllable switch 425 to form a filter capacitor network. The first capacitor C424, the controllable switch 425, and the second capacitor C426 may form a capacitive circuit, e.g., a controllable capacitive circuit.

The controllable RFI filter circuit 420 may also comprises a resistor R428. The filter capacitor network may be coupled in series with the resistor R428 (e.g., a filter resistor) between the hot terminal H and the dimmed hot terminal. The controllable RFI filter circuit 420 may further comprise a second controllable switch 429 coupled in parallel with the resistor R428. The control circuit 414 may be configured to render the second controllable switch 429 conductive to short the resistor R428, such that filter capacitor network is coupled between the hot terminal H and the dimmed hot terminal DH (e.g., to configure the controllable RFI filter circuit 420 as an LC filter circuit). The control circuit 414 may be configured to render the second controllable switch 429 non-conductive to connect the resistor R428 in series with the filter capacitor network between the hot terminal H and the dimmed hot terminal DH (e.g., to configure the controllable RFI filter circuit 420 as an RLC filter circuit). The resistor R428 and the controllable switch 429 may form a resistive circuit, e.g., a controllable resistive circuit. In some examples, the resistor R428 and the second controllable switch 429 may also be omitted from the dimmer switch 400, and for example, may be replaced with a short to provide a controllable LC circuit (e.g., so that the controllable RFI filter circuit 420 acts as a controllable LC circuit). The controllable switches 425 and/or 429 may be a single transistor (e.g., a FET), an optocoupler, a relay, or another type of controllable switching circuit.

The control circuit 414 may be configured to render the first controllable switch 425 non-conductive to control the capacitance between the hot terminal H and the dimmed hot terminal DH to a first value (e.g., by only coupling the second capacitor C426 between the hot terminal H and the dimmed hot terminal DH), for example, when the second controllable switch 429 is conductive. The control circuit 414 may be configured to render the first controllable switch 425 conductive to control (e.g., increase) the capacitance between the hot terminal H and the dimmed hot terminal DH to a second value (e.g., by coupling the first and second capacitors C424, C426 in parallel between the hot terminal H and the dimmed hot terminal DH). In some examples, the controllable RFI filter circuit 420 may include the first capacitor C424 but not the second capacitor C426. In such examples, the control circuit 414 may be configured to render the first controllable switch 425 non-conducive and conductive to change the capacitance between the hot terminal H and the dimmed hot terminal DH from a first capacitance (e.g., zero capacitance) to a second capacitance (e.g., the capacitance provided by the first capacitor C424), respectively.

The control circuit 414 may be configured to adjust the filtering characteristics of the controllable RFI filter circuit 420 (e.g., control the capacitance and/or resistance of the controllable RFI filter circuit 420). For example, the control circuit 414 may switch the controllable RFI filter circuit 420 between an LC filter circuit and an RLC filter circuit based on, for example, on or more factors, such as the state of the electrical load (e.g., whether the electrical load is on or off, the intensity of the electrical load, during or after a turn-on period, etc.). Further, as discussed in more detail below, the control circuit 414 may be configured to adjust the filtering characteristics of the controllable RFI filter circuit 420 when in an advanced programming mode.

The control circuit 414 may be configured to control the first controllable switch 425 and/or the second controllable switch 429 of the controllable RFI filter circuit 420 in response to the state of the electrical load (e.g., the state of the triac 410). For example, the control circuit 414 may be configured to render the first controllable switch 425 non-conductive to couple just the second capacitor C426 between the hot terminal H and the dimmed hot terminal DH when the electrical load is off. Alternatively or additionally, the control circuit 414 may be configured to render the second controllable switch 429 non-conductive to connect the resistor R428 in series with the filter capacitor network between the hot terminal H and the dimmed hot terminal DH when the electrical load is off. The control circuit 414 may be configured to render the first controllable switch 425 conductive to couple the first and second capacitors C424, C426 in parallel between the hot terminal H and the dimmed hot terminal DH when the electrical load is on. And alternatively or additionally, the control circuit 414 may be configured to render the second controllable switch 429 conductive to short the resistor R428 between the hot terminal H and the dimmed hot terminal DH when the electrical load is on. In some examples, the control circuit may apply a delay between rendering the first controllable switch 425 conductive and rendering the second controllable switch 429 non-conductive in response to turning the electrical load on.

The control circuit 414 may be configured to control the first controllable switch 425 and/or the second controllable switch 429 to provide a different impedance between the hot terminal H and the dimmed hot terminal DH while the dimmer switch 400 is turning on the lighting load (e.g., during a turn-on sequence) than while the dimmer switch 400 is in a steady state condition. The control circuit 414 may be configured to adjust the impedance (e.g., impedance level) provided between the hot terminal H and the dimmed hot terminal DH during a turn-on period after one of the actuators 416 is actuated to turn the electrical load on and/or after the air-gap switch 412 is closed to turn on the electrical load. For example, the control circuit 414 may be configured to render the first controllable switch 425 non-conductive to couple just the second capacitor C426 between the hot terminal H and the dimmed hot terminal DH during the turn-on period.

Alternatively or additionally, the control circuit 414 may be configured to render the second controllable switch 429 non-conductive to connect the resistor R428 in series with the filter capacitor network between the hot terminal H and the dimmed hot terminal DH during the turn-on period. The control circuit 414 may be configured to render the first controllable switch 425 conductive to couple the first and second capacitors C424, C426 in parallel between the hot terminal H and the dimmed hot terminal DH after the end of the turn-on period (e.g., during steady state). And alternatively or additionally, the control circuit 414 may be configured to render the second controllable switch 429 conductive to short the resistor R428 between the hot terminal H and the dimmed hot terminal DH after the end of the turn-on period (e.g., during steady state). In some example, the control circuit may apply a delay between rendering the first controllable switch 425 conductive and rendering the second controllable switch 429 non-conductive after the end of the turn-on period.

The control circuit 414 may be configured to control the controllable RFI filter circuit 420 to provide a different impedance between the hot terminal H and the dimmed hot terminal DH during different portions of the dimming range of the dimmer switch 400. For example, the control circuit 414 may close the controllable switch 425 to connect the capacitor C424 between the hot terminal H and the dimmed hot terminal DH to increase the capacitance when the intensity level $L_{TRGT}$ is between a low intensity threshold $L_{LOW}$ (e.g., 25% intensity) and a high intensity threshold $L_{HIGH}$ (e.g., 75% intensity) (e.g., near the middle of the dimming range), such as when the triac 410 is switching near the peak of the AC line voltage. Alternatively or additionally, the control circuit 414 may close the controllable switch 429 to decrease the resistance of the controllable RFI filter circuit 420 when the intensity level $L_{TRGT}$ is between the low intensity threshold $L_{LOW}$ and the high intensity threshold $L_{HIGH}$ (e.g., near the middle of the dimming range). The control circuit may open the controllable switch 425 to disconnect the capacitor C424 between the hot terminal H and the dimmed hot terminal DH to decrease the capacitance when the intensity level $L_{TRGT}$ is not between the low intensity threshold $L_{LOW}$ and the high intensity threshold $L_{HIGH}$ (e.g., during the other portions of the dimming range). Alternatively or additionally, the control circuit 414 may open the controllable switch 429 to increase the resistance of the controllable RFI filter circuit 420 when the intensity level L TRGT is not between the low intensity threshold $L_{LOW}$ and the high intensity threshold $L_{HIGH}$ (e.g., during the other portions of the dimming range). In some example, the control circuit may apply a delay between rendering the first controllable switch 425 conductive and rendering the second controllable switch 429 non-conductive when transitioning into and out of the middle of the dimming range.

Further, in some examples, the control circuit 414 may be configured to control the controllable RFI filter circuit 420 to provide a different impedance between the hot terminal H and the dimmed hot terminal DH at an upper end of the dimming range of the dimmer switch 400 (e.g., when the target intensity is above 80%). For example, the control circuit 414 may open the controllable switch 425 to disconnect the capacitor C424 and/or open the controllable switch 429 to connect the resistor R428 between the hot terminal H and the dimmed hot terminal DH when the target intensity $L_{TRGT}$ is above an upper threshold of the dimming range (e.g., above 80%). And the control circuit 414 may close the controllable switch 425 to connect the capacitor C424 and/or close the controllable switch 429 to short the resistor R428 between the hot terminal H and the dimmed hot terminal DH when the target intensity $L_{TRGT}$ is below the upper threshold of the dimming range and the electrical load is on (e.g., between the minimum intensity level and 80%). Finally, the control circuit 414 may open the controllable switch 425 to disconnect the capacitor C424 and/or open the controllable switch 429 to connect the resistor R428 between the hot terminal H and the dimmed hot terminal DH when the electrical load is off.

The dimmer switch 400 may further comprise a dimmer voltage measurement circuit 460 that may be electrically coupled between the hot terminal H and the dimmed hot terminal DH (e.g., in parallel with the triac 410 and the controllable RFI filter circuit 420). The dimmer voltage measurement circuit 460 may generate a dimmer voltage feedback signal $V_{DV}$ that may indicate a magnitude of a voltage developed across the dimmer switch 400. For example, the dimmer voltage measurement circuit 460 may comprise a scaling circuit, such as a resistive divider circuit, such that the dimmer voltage feedback signal $V_{DV}$ is a scaled version of the voltage developed across the dimmer switch 400.

The control circuit 414 may receive the dimmer voltage feedback signal $V_{DV}$. For example, the control circuit 414 may comprise an analog-to-digital converter (ADC) for sampling the dimmer voltage feedback signal $V_{DV}$. The control circuit 414 may be configured to periodically sample the dimmer voltage feedback signal $V_{DV}$ a number of times during a sampling window $T_{SAMPLE}$ after the control circuit renders the triac 410 conductive at the firing time. The control circuit 414 may be configured to determine a slope $m_{DV}$ of the dimmer voltage feedback signal $V_{DV}$ (e.g., a rate of change of the dimmer voltage feedback signal $V_{DV}$) while the triac 410 is transitioning from the non-conductive state to the conductive state. If the magnitude of the slope $m_{DV}$ (e.g., the absolute value of the slope $m_{DV}$) of the dimmer voltage feedback signal $V_{DV}$ too high (e.g., exceeds a predetermined threshold $TH_{SLOPE}$), the control circuit 414 may control the controllable RFI filter circuit 420 to adjust the filtering characteristics of the controllable RFI filter circuit 420. For example, the control circuit 414 may be configured to close the controllable switch 425 to connect the capacitor C424 between the hot terminal H and the dimmed hot terminal DH to increase the capacitance of the controllable RFI filter circuit 420 when the magnitude of the slope $m_{DV}$ of the dimmer voltage feedback signal $V_{DV}$ exceeds the predetermined threshold $TH_{SLOPE}$. The control circuit 414 may be configured to adjust the filtering characteristics of the controllable RFI filter circuit 420 in response to the slope $m_{DV}$ of the dimmer voltage feedback signal $V_{DV}$ when the dimmer switch 400 is first powered on and/or each time that the dimmer switch 400 is powered on (e.g., when the air-gap switch 412 is adjusted from an open state to a closed state). The control circuit 414 may be configured to store the determined filtering characteristics of the controllable RFI filter circuit 420 (e.g., the states of the controllable switches 425, 429) in the memory.

Although not illustrated, the controllable RFI filter circuit 420 may include any number of capacitors, resistors, and/or associated controllable switches. Further, in some examples, the controllable RFI filter circuit 420 may include multiple inductors. For example, the controllable RFI filter circuit 420 may include multiple RLC circuits that can be controlled by the control circuit 414 to be switched in/out based on, for example, the state of the electrical load. Further, the controllable RFI filter circuit 420 may include more resistors and/or capacitors and more associated switches that can be controlled by the control circuit 414 to, for example, allow for the control circuit 414 to more precisely control the impedance of the controllable RFI filter circuit 420.

Additionally, it should be appreciated that in some examples, the dimmer switch 400 may be configured to adjust the operation and/or filtering characteristics of the controllable RFI filter circuit 420 using the advanced programming mode. For example, when the control circuit 414 is placed in the advanced programming mode, the control circuit 414 may adjust the impedance (e.g., the capacitance and/or the resistance) of the controllable RFI filter circuit 420 in response to a received user input (e.g., a manual actuation of one or more of the actuators 416). In addition, the advanced programming mode may be used to change the load control device between a plurality of filter modes. For example, the filter modes may include, but are not limited to a first filter mode where the second controllable switch 429 is closed and the first controllable switch 425 can be controlled to change capacitance value of the controllable RFI filter circuit 420 (e.g., control of the controllable switch 429 is disabled), and a second filter mode where the second controllable switch 429 can be controlled to change the controllable RFI filter circuit 420 between an LC filter circuit and an RLC filter circuit (e.g., control of the controllable switch 429 is enabled). Further, the user may enable or disable the control circuit 414 from adjusting (e.g., automatically adjusting) the impedance of the controllable RFI filter circuit 420 and/or the filter mode.

Figure 5:
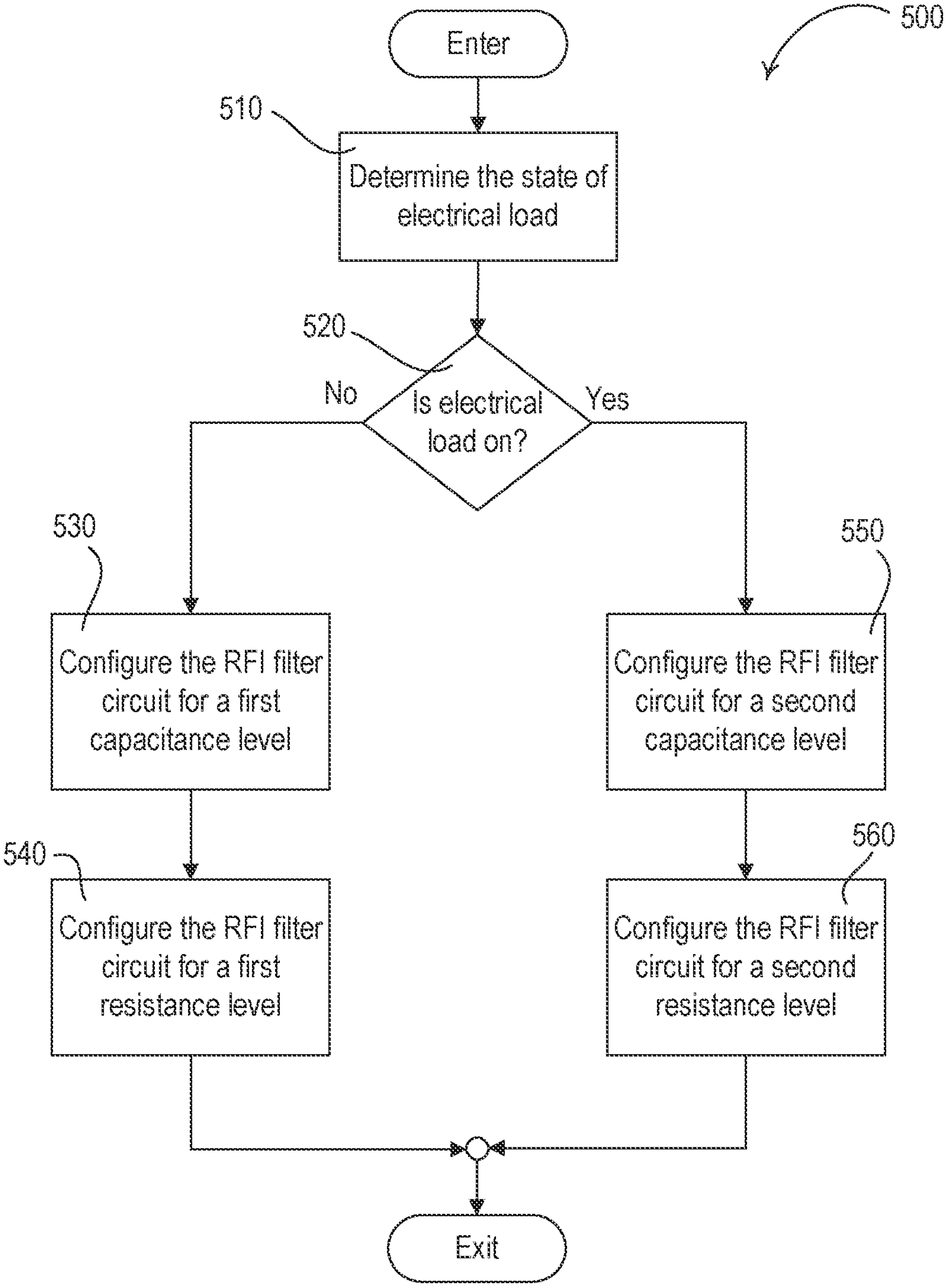
FIGS. 5-8 are flowcharts of example filter circuit control procedures that may be performed by a load control device, such as a dimmer switch.

FIG. 5 is a flowchart of a filter circuit control procedure 500 that may be performed by a control circuit of a load control device, such as the control circuit of the dimmer switch 100, the control circuit 214 of the dimmer switch 200, the control circuit 314 of the dimmer switch 300, and/or the control circuit 414 of the dimmer switch 400. The control circuit may perform the control procedure 500 periodically. The control circuit may determine the state of the electrical load at 510. For example, the control circuit may determine the state of the electrical load based on the state of the bidirectional semiconductor switch of the load control device (e.g., based on whether the bidirectional semiconductor switch is conductive or non-conductive).

At 520, the control circuit may determine whether the electrical load is on or off. If the control circuit determines that the electrical load is off at 520, the control circuit may configure a filter circuit (e.g., a controllable RFI filter circuit, such as the controllable RFI filter circuit 220, the controllable RFI filter circuit 320, or the controllable RFI filter circuit 420) for a first capacitance level at 530 and/or a first resistance level at 540 before exiting the control procedure 500. If the control circuit determines that the electrical load is on at 520, the control circuit may configure the filter circuit (e.g., the controllable RFI filter circuit) for a second capacitance level at 550 and/or a second resistance level at 560 before exiting the control procedure 500. The control circuit may configure the filter circuit for the second capacitance and/or resistance level by closing one or more controllable switches of the filter circuit (e.g., controllable switch 325, controllable switch 425, controllable switch 429, etc.). In some examples, the second capacitance level may be greater than the first capacitance level, and the second resistance level may be less than the first resistance level.

Further, although described with reference to a first and second capacitance level and a first and second resistance level, the control procedure 500 may be configured with just a first and second capacitance level or a first and second resistance level. That is, in some examples, the control procedure 500 may be configured to hold the capacitance or the resistance constant regardless of whether the control circuit determines that the electrical load is on or off (e.g., regardless of the state of the electrical load). For instance, the capacitance or resistance may be held constant if, for example, the filter circuit does not include a switch and a capacitor/resistor (e.g., if the resistor R428 and the controllable switch 429 are omitted from the controllable RFI filter circuit 420). In addition, the filter circuit may simply comprise a capacitor coupled in series with a switch (e.g., if the second capacitor C426, the resistor R428, and the controllable switch 429 are omitted from the controllable RFI filter circuit 420), such that the second capacitance level may be essentially no capacitance. Finally, it should be appreciated that in some examples, the control circuit may control the controllable switches simultaneously or with a delay when configuring the filter circuit with the first/second capacitance and/or the first/second resistance when performing the control procedure 500.

Figure 6:
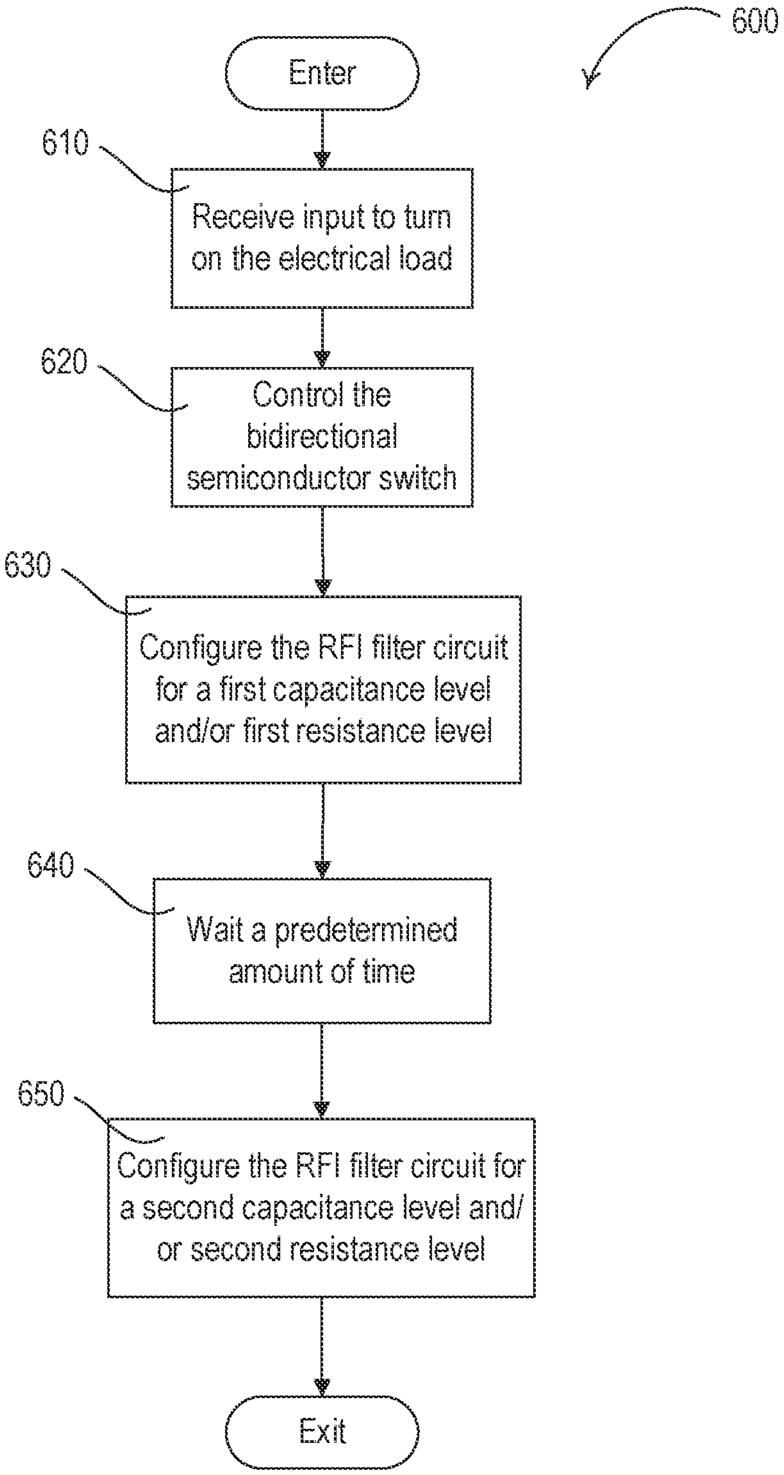

FIG. 6 is a flowchart of a filter circuit control procedure 600 that may be performed by a control circuit of a load control device, such as the control circuit of the dimmer switch 100, the control circuit 214 of the dimmer switch 200, the control circuit 314 of the dimmer switch 300, and/or the control circuit 414 of the dimmer switch 400. The control circuit may perform the control procedure 600 periodically. The control circuit may receive an input to turn on the electrical load at 610. For example, the control circuit may receive the input to turn on the electrical load via an actuator of the load control device (e.g., the rocker switch 116, the actuator 216, and/or the actuator 416) and/or via a signal received from a remote switch. At 620, the control circuit may control a bidirectional semiconductor switch (e.g., the triac 410) to turn on the electrical load in response to receiving the input.

In some examples, the control circuit may receive the input to turn on the electrical load at 610 from actuators that are coupled to the control circuit (e.g., the actuators 416). Moreover, in some examples, the control circuit may receive the input to turn on the electrical load at 610 from the closing of an air-gap switch, which provides power to the control circuit (e.g., so the power to the control circuit is the input to turn on the electrical load). For example, an actuator of the dimmer switch (e.g., a toggle actuator) may be coupled to an air-gap switch of the dimmer switch (e.g., the air-gap switch 412), and when the air-gap switch is closed, power may be provided to the control circuit, and the control circuit may control the bidirectional semiconductor switch to turn on the load at 620. Further, in some examples, the air-gap switch may be closed prior to the control circuit receiving the input to turn on the electrical load, for example, if the load control device is a smart dimmer (e.g., the dimmer switch 400), where the air-gap switch is controlled in the closed position even when the load control device is not powering the electrical load. In such instances, the control circuit may receive the input to turn on the electrical load at 610 via an actuator (e.g., by detecting an actuation of the actuator), via a wireless control signal, and/or the like.

The control circuit may configure a filter circuit (e.g., a controllable RFI filter circuit) for a first capacitance level and/or a first resistance level at 630. The control circuit may then wait a predetermined amount of time at 640 (e.g., through use of a delay circuit). The predetermined amount of time may be based on a particular number of line cycles of the AC power source. After the predetermined amount of time, the control circuit may configure the filter circuit (e.g., the controllable RFI filter circuit) for a second capacitance level and/or a second resistance level at 650 before exiting the control procedure 600. The control circuit may configure the filter circuit for the second capacitance and/or resistance level by closing one or more controllable switches of the filter circuit (e.g., the controllable switch 325, the controllable switch 425, the controllable switch 429, etc.). The second capacitance level and second resistance level may be greater than the first capacitance level and first resistance level, respectively.

Further, although described with reference to a first and second capacitance level and a first and second resistance level, the control procedure 600 may be configured with just a first and second capacitance level or a first and second resistance level. That is, in some examples, the control procedure 600 may be configured to hold the capacitance or the resistance constant regardless of whether the control circuit determines that the electrical load is on or off (e.g., regardless of the state of the electrical load). For instance, the capacitance or resistance may be held constant if, for example, the filter circuit does not include a switch and a capacitor/resistor (e.g., if the resistor R428 and the controllable switch 429 are omitted from the controllable RFI filter circuit 420). In addition, the filter circuit may simply comprise a capacitor coupled in series with a switch (e.g., if the second capacitor C426, the resistor R428, and the controllable switch 429 are omitted from the controllable RFI filter circuit 420), such that the second capacitance level may be essentially no capacitance. Finally, it should be appreciated that in some examples, the control circuit may control the controllable switches simultaneously or with a delay when configuring the filter circuit with the first/second capacitance and/or the first/second resistance when performing the control procedure 600.

Figure 7:
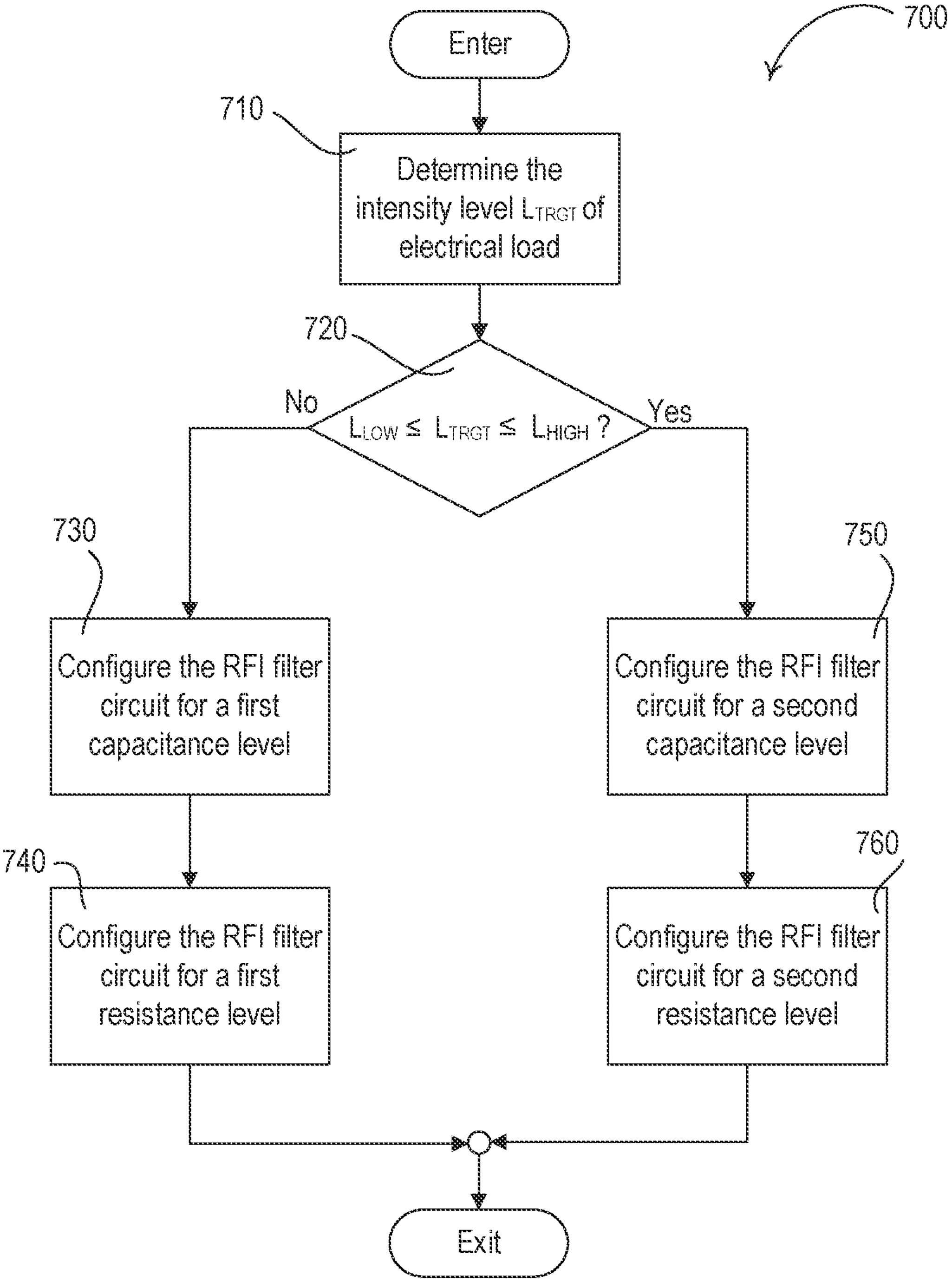

FIG. 7 is a flowchart of a filter circuit control procedure 700 that may be performed by a control circuit of a load control device, such as the control circuit of the dimmer switch 100, the control circuit 214 of the dimmer switch 200, the control circuit 314 of the dimmer switch 300, and/or the control circuit 414 of the dimmer switch 400. The control circuit may perform the control procedure 700 periodically. The control circuit may determine the intensity level $L_{TRGT}$ of the electrical load at 710. For example, the control circuit may determine the intensity level L TRGT of the electrical load based on information received from an intensity adjustment actuator of the load control device.

At 720, the control circuit may determine if the intensity level $L_{TRGT}$ is between a low intensity threshold $L_{LOW}$ (e.g., 25% intensity) and a high intensity threshold $L_{HIGH}$ (e.g., 75% intensity). If the control circuit determines that the intensity level $L_{TRGT}$ is not between the low intensity threshold $L_{LOW}$ and the high intensity threshold $L_{HIGH}$ at 720, then the control circuit may configure a filter circuit (e.g., a controllable RFI filter circuit) for a first capacitance level at 730 and/or a first resistance level at 740 before exiting the control procedure 700. If the control circuit determines that the intensity level $L_{TRGT}$ is between the low intensity threshold $L_{LOW}$ and the high intensity threshold $L_{HIGH}$ at 720, then the control circuit may configure the filter circuit (e.g., the controllable RFI filter circuit) for a second capacitance level at 750 and/or a second resistance level at 760 before exiting the control procedure 700. The control circuit may configure the filter circuit for the second capacitance and/or resistance level by closing one or more controllable switches of the filter circuit (e.g., the controllable switch 325, the controllable switch 425, the controllable switch 429, etc.). The second capacitance level and second resistance level may be greater than the first capacitance level and first resistance level, respectively.

Further, although described with reference to a first and second capacitance level and a first and second resistance level, the control procedure 700 may be configured with just a first and second capacitance level or a first and second resistance level. That is, in some examples, the control procedure 700 may be configured to hold the capacitance or the resistance constant regardless of whether the control circuit determines that the intensity level $L_{TRGT}$ is between the low intensity threshold $L_{LOW}$ and the high intensity threshold $L_{HIGH}$. The control circuit may control the controllable switches simultaneously or with a delay when configuring the filter circuit with the first/second capacitance and/or the first/second resistance when performing the control procedure 700.

Figure 8:
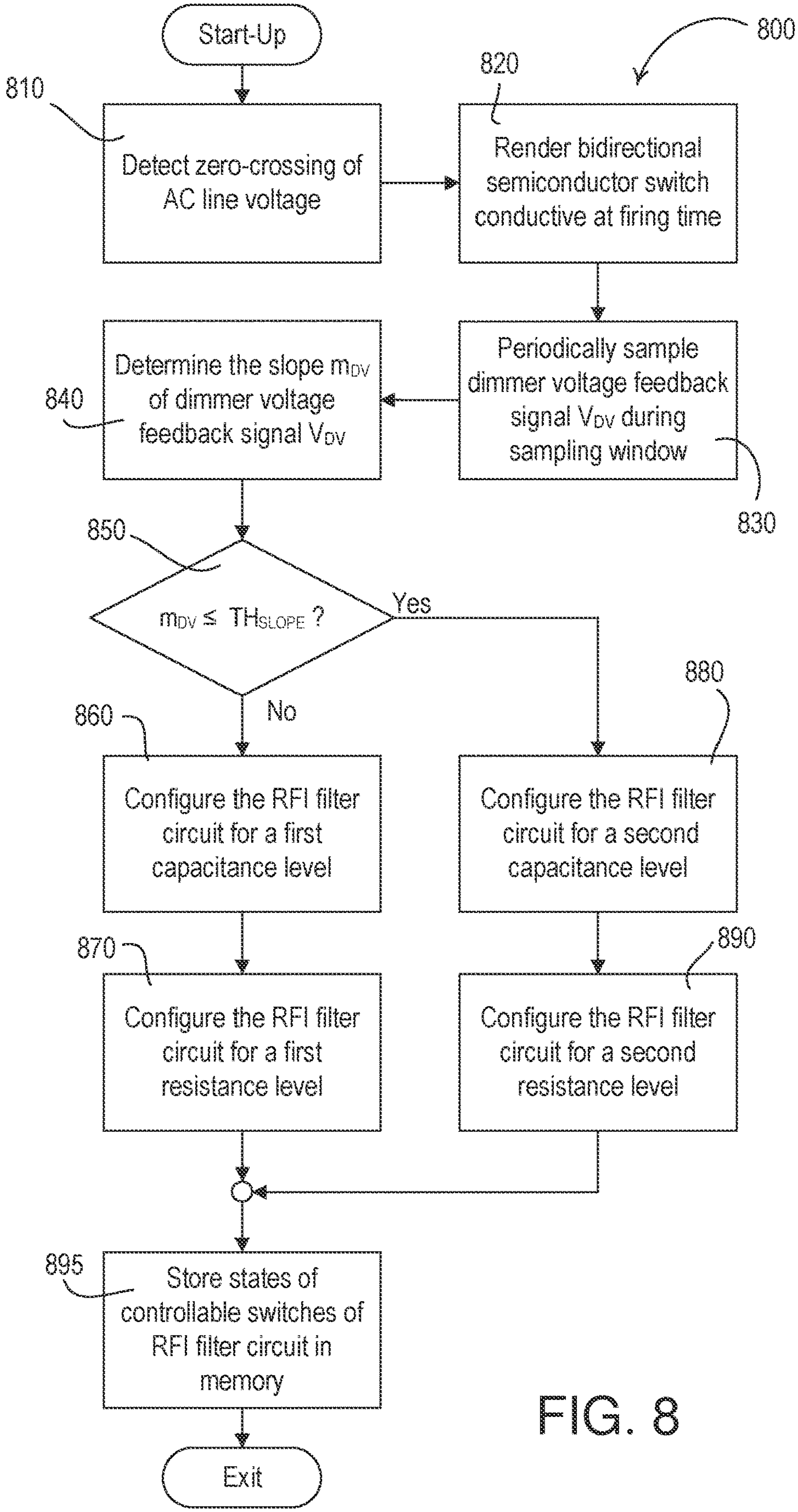

FIG. 8 is a flowchart of a filter circuit control procedure 800 that may be performed by a control circuit of a load control device, such as the control circuit of the dimmer switch 100, the control circuit 214 of the dimmer switch 200, the control circuit 314 of the dimmer switch 300, and/or the control circuit 414 of the dimmer switch 400. The control circuit may perform the control procedure 800, for example, at start-up of the load control device (e.g., during a start-up routine executed by the control circuit when the load control device is first powered on and/or each time that the load control device is powered on). At 810, the control circuit may detect a zero-crossing of the AC line voltage (e.g., in response to the zero-cross signal $V_{ZC}$ generated by the zero-cross detect circuit 432 of the dimmer switch 400). At 820, the control circuit may render a bidirectional semiconductor switch of the dimmer switch (e.g., the triac 410) conductive at a firing time during the present half-cycle of the AC line voltage (e.g., as timed from the zero-crossing detected at 810). For example, the control circuit may determine a value for the firing time based on information received from an intensity adjustment actuator of the load control device.

The control circuit may be responsive to a dimmer voltage feedback signal $V_{DC}$ (e.g., the dimmer voltage feedback signal $V_{DC}$ generated by the dimmer voltage measurement circuit 460 shown in FIG. 4), which may indicate a magnitude of a voltage developed across the dimmer switch. At 830, the control circuit may periodically sample the dimmer voltage feedback signal $V_{DC}$ a number of times during a sampling window $T_{SAMPLE}$ after the control circuit renders the bidirectional semiconductor switch conductive at the firing time. At 840, the control circuit may determine a slope $m_{DV}$ of the dimmer voltage feedback signal $V_{DV}$ while the bidirectional semiconductor switch is transitioning from the non-conductive state to the conductive state by processing the values of the dimmer voltage feedback signal $V_{DC}$ sampled during the sampling window $T_{SAMPLE}$. For example, the control circuit may perform a least-squares fit on the values of the dimmer voltage feedback signal $V_{DC}$ sampled during the sampling window $T_{SAMPLE}$ to determine the slope $m_{DV}$ of the dimmer voltage feedback signal $V_{DV}$ at 840. In addition, the control circuit may determine the slope of the dimmer voltage feedback signal $V_{DC}$ at 840 from a minimum value $V_{MIN}$ and maximum value $V_{MAX}$ of the values of the dimmer voltage feedback signal $V_{DC}$ sampled during the sampling window $T_{SAMPLE}$ (e.g., $m_{DV}=|(V_{MAX}-V_{MIN})/T_{SAMPLE}|$).

At 850, the control circuit may determine if the magnitude of the slope $m_{DV}$ (e.g., the absolute value of the slope $m_{DV}$) of the dimmer voltage feedback signal $V_{DV}$ is greater than or equal to a predetermined threshold $TH_{SLOPE}$. If the magnitude of the slope m D v of the dimmer voltage feedback signal $V_{DV}$ is greater than or equal to the predetermined threshold $TH_{SLOPE}$ at 850, the control circuit may configure a filter circuit (e.g., a controllable RFI filter circuit) for a first capacitance level at 860 and/or a first resistance level at 870. If the control circuit determines that the magnitude of the slope $m_{DV}$ of the dimmer voltage feedback signal $V_{DV}$ is less than the predetermined threshold $TH_{SLOPE}$ at 850, the control circuit may configure the filter circuit (e.g., the controllable RFI filter circuit) for a second capacitance level at 880 and/or a second resistance level at 890. The control circuit may configure the filter circuit for the second capacitance and/or resistance level by closing one or more controllable switches of the filter circuit (e.g., the controllable switch 325, the controllable switch 425, the controllable switch 429, etc.). The first capacitance level and first resistance level may be greater than the second capacitance level and second resistance level, respectively. At 895, the control circuit may store the states of the controllable switches of the filter circuit (e.g., the controllable switches 325, 425, 429) in memory before exiting the control procedure 800.

Further, although described with reference to a first and second capacitance level and a first and second resistance level, the control procedure 800 may be configured with just a first and second capacitance level or a first and second resistance level. That is, in some examples, the control procedure 800 may be configured to hold the capacitance or the resistance constant regardless of whether the control circuit determines that the intensity level $L_{TRGT}$ is between the low intensity threshold $L_{LOW}$ and the high intensity threshold $L_{HIGH}$. For instance, the capacitance or resistance may be held constant if, for example, the filter circuit does not include a switch and a capacitor/resistor (e.g., if the resistor R428 and the controllable switch 429 are omitted from the controllable RFI filter circuit 420). In addition, the filter circuit may simply comprise a capacitor coupled in series with a switch (e.g., if the second capacitor C426, the resistor R428, and the controllable switch 429 are omitted from the controllable RFI filter circuit 420), such that the second capacitance level may be essentially no capacitance. Finally, it should be appreciated that in some examples, the control circuit may control the controllable switches simultaneously or with a delay when configuring the filter circuit with the first/second capacitance and/or the first/second resistance when performing the control procedure 800.

What is claimed is:

1. A controllable filter circuit for use in a load control device that includes a bidirectional semiconductor switch, a first terminal adapted to be coupled to an alternating-current (AC) power source, and a second terminal adapted to be coupled to the electrical load, the filter circuit comprising:

a first capacitor coupled in series between the first terminal and the second terminal;

an inductor coupled in series between the bidirectional semiconductor switch and the second terminal; and a controllable switch coupled in series with the first capacitor between the first terminal and the second terminal;

wherein controllable switch is configured to be rendered conductive and non-conductive to respectively connect and disconnect the first capacitor from the series connection between the first terminal and the second terminal to adjust the impedance of the filter circuit.

2. The filter circuit of claim 1, further comprising:

a resistor coupled in series between the first terminal and the second terminal.

3. The filter circuit of claim 2, further comprising:

a second controllable switch, wherein the resistor and the second controllable switch are coupled in parallel between the first terminal and the second terminal; and wherein the control circuit is configured to render the second controllable switch conductive and non-conductive to respectively disconnect and connect the resistor from the series connection between the first terminal and the second terminal to adjust the impedance of the filter circuit.

4. The filter circuit of claim 1, further comprising:

a second capacitor in series connection between the first terminal and the second terminal, the first capacitor and the second capacitor coupled in parallel between the first terminal and the second terminal.

5. A method for controlling a controllable filter circuit in a load control device, the load control device having a first terminal adapted to be coupled to an alternating-current (AC) power source and a second terminal adapted to be coupled to an electrical load, the method comprising:

configuring the filter circuit for a first impedance level when the electrical load is in a first power state; and configuring the filter circuit for a second impedance level when the electrical load is in a second power state by rendering a controllable switch of the filter circuit conductive to connect a first capacitor of the filter circuit in series connection between the first terminal and the second terminal.

6. The method of claim 5, wherein the filter circuit further comprises a second capacitor in series connection between the first terminal and the second terminal, the first capacitor and the second capacitor coupled in parallel between the first terminal and the second terminal.

7. The method of claim 6, wherein configuring the filter circuit for the first impedance level comprises rendering the controllable switch non-conductive to control a capacitance between the first terminal and the second terminal to a first value by coupling only the second capacitor between the first terminal and the second terminal; and wherein configuring the filter circuit for the second impedance level comprises rendering the controllable switch conductive to increase the capacitance between the first terminal and the second terminal to a second value by coupling the first capacitor and the second capacitor in parallel between the first terminal and the second terminal.

8. The method of claim 5, wherein the filter circuit comprises the capacitor, an inductor, and a resistor.

9. The method of claim 8, wherein the filter circuit further comprises a second controllable switch, and the resistor and the second controllable switch are coupled in parallel between the first terminal and the second terminal, and the first capacitor and the controllable switch are coupled in series between the first terminal and the second terminal;

wherein configuring the filter circuit for the first impedance level comprises rendering the second controllable switch conductive and rendering the first controllable switch non-conductive; and wherein configuring the filter circuit for the second impedance level comprises rendering the second controllable switch non-conductive and rendering the first controllable switch conductive.

10. The method of claim 5, wherein the electrical load is off in the first power state and the electrical load is on in the second power state.

11. The method of claim 5, further comprising:

controlling the electrical load to be on in the first power state; and controlling the electrical load to be off in the second power state.

12. The method of claim 5, further comprising:

determining a power state of the electrical load;

upon determining that the electrical load is in the first power state, configuring the filter circuit for the first impedance level; and upon determining that the electrical load is in the second power state, configuring the filter circuit for the second impedance level.

13. The method of claim 5, further comprising:

receiving an input representing a desired power state; and controlling the electrical load according to the desired power state.

14. The method of claim 5, wherein the filter circuit comprises the first capacitor and an inductor.

15. A method for controlling a filter circuit in a load control device, the load control device comprising a first terminal adapted to be coupled to an alternating-current (AC) power source and a second terminal adapted to be coupled to an electrical load, the method comprising:

receiving an input to turn on the electrical load;

controlling a bidirectional semiconductor switch of the load control device to provide a phase-control voltage to the electrical load, the bidirectional semiconductor switch coupled in series between the first terminal and the second terminal;

configuring the filter circuit for a first impedance level;

waiting a predetermined amount of time; and after the predetermined amount of time, configuring the filter circuit for a second impedance level by rendering a controllable switch of the filter circuit conductive to connect a first capacitor of the filter circuit in series connection between the first terminal and the second terminal.

16. The method of claim 15, wherein the predetermined amount of time comprises a predetermined number of line cycles of the AC power source.

17. The method of claim 15, wherein the load control device comprises a delay circuit that is configured to render the controllable switch conductive after the predetermined amount of time.

18. The method of claim 15, wherein receiving an input to turn on the electrical load further comprises closing an air-gap switch prior to rending the bidirectional semiconductor switch conductive.

19. The method of claim 15, wherein receiving an input to turn on the electrical load further comprises detecting an actuation of an actuator of the load control device.

20. The method of claim 15, wherein receiving an input to turn on the electrical load further comprises receiving a wireless control signal.

21. A method for controlling a controllable filter circuit in a load control device, the load control device comprising a first terminal adapted to be coupled to an alternating-current (AC) power source and a second terminal adapted to be coupled to an electrical load, the method comprising:

determining a target intensity level of the electrical load;

determining whether the target intensity level is in a first range or a second range; and configuring an impedance level of the filter circuit between the first and second terminals based on the determination of whether the target intensity level is in the first range or the second range.

22. The method of claim 21, further comprising:
upon determining that the target intensity level is in the first range, configuring the filter circuit for a first impedance level; and
upon determining that the target intensity level is in the second range, configuring the filter circuit for a second impedance level.

23. The method of claim 22, wherein configuring the filter circuit for the second impedance level comprises rendering a controllable switch of the filter circuit conductive to connect a capacitor of the filter circuit in series connection between the first terminal and the second terminal.

24. The method of claim 21, further comprising:
upon determining that the target intensity level is in the first range, configuring the filter circuit for a first impedance level.

25. The method of claim 21, wherein the first range is above an upper intensity threshold and below a lower intensity threshold, and the second range is between the upper and lower intensity threshold.

26. The method of claim 21, wherein the first range is above 80% of a maximum intensity and below a 20% of maximum intensity, and the second range is between 20% and 80% of the maximum intensity of the electrical load.

27. The method of claim 21, wherein determining the target intensity comprises receiving, via a user input, an input indicating the target intensity.

28. A method for controlling a controllable filter circuit in a load control device, the load control device comprising a first terminal adapted to be coupled to an alternating-current (AC) power source and a second terminal adapted to be coupled to an electrical load, the method comprising:
rendering a bidirectional semiconductor switch of the load control device conductive, the bidirectional semiconductor switch coupled between the first and second terminals;
receiving a feedback signal indicating a magnitude of a voltage developed across the load control device;
measuring a slope of the feedback signal when the bidirectional semiconductor switch is transitioning from a non-conductive state to a conductive state; and
configuring an impedance level of the filter circuit between the first and second terminals in response to the slope of the feedback signal.

29. The method of claim 28, further comprising:
increasing a capacitance of the filter circuit between the first terminal and the second terminal when the slope exceeds a predetermined threshold.

30. The method of claim 28, wherein measuring a slope of the feedback signal further comprises measuring the slope of the feedback signal and subsequently adjusting the impedance level of the filter circuit in response to the slope of the feedback signal during a start-up routine when the load control device is powered on.

* * * * *